(12) United States Patent
Paulsen et al.

(10) Patent No.: US 9,608,266 B2
(45) Date of Patent: Mar. 28, 2017

(54) CATHODE MATERIAL FOR LITHIUM-ION RECHARGEABLE BATTERIES

(71) Applicant: Umicore, Brussels (BE)

(72) Inventors: Jens Martin Paulsen, Daejeon (KR); Maxime Blangero, Cheonan (KR)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 14/926,542

(22) Filed: Oct. 29, 2015

(65) Prior Publication Data

US 2016/0099469 A1 Apr. 7, 2016

Related U.S. Application Data

(63) Continuation-in-part of application No. 13/308,704, filed on Dec. 1, 2011, now Pat. No. 9,177,689, which
(Continued)

(30) Foreign Application Priority Data

Jun. 29, 2007 (EP) ..................................... 07012789

(51) Int. Cl.
*H01M 4/525* (2010.01)
*H01M 4/485* (2010.01)
(Continued)

(52) U.S. Cl.
CPC ............ *H01M 4/485* (2013.01); *C01G 53/50* (2013.01); *H01B 1/08* (2013.01); *H01M 4/366* (2013.01);
(Continued)

(58) Field of Classification Search
None
See application file for complete search history.

(56) References Cited

U.S. PATENT DOCUMENTS 6,040,090 A 3/2000 Sunagawa et al.
6,228,529 B1 * 5/2001 Kitoh ..................... H01M 4/13
429/164

(Continued)

FOREIGN PATENT DOCUMENTS

EP 1189296 3/2002
EP 1556915 5/2004
(Continued)

OTHER PUBLICATIONS

Paulsen et al., "Core-Shell Cathode Material with Size-Dependent Composition," Electrochemical and Solid-State Letters, vol. 10, No. 4, (2007), pp. A101-A105.

*Primary Examiner* — Lucas J. O'Donnell
(74) *Attorney, Agent, or Firm* — Brinks Gilson & Lione

(57) ABSTRACT

Disclosed are a cathode active material and a method to produce the same at low cost. The cathode powder comprises modified doped $LiCoO_2$ carrying a secondary phase having either one of space groups Fm-3m or Fd-3mS. The modified $LiCoO_2$ is Ni and Mn bearing and has regions of low and high manganese content, where regions with high manganese content are located in islands on the surface. The cathode material has high cycling stability, a very high rate performance and good high temperature storage properties.

18 Claims, 13 Drawing Sheets

LCO-1

Example 1a

Related U.S. Application Data is a continuation-in-part of application No. 12/374,532, filed as application No. PCT/EP2008/000313 on Jan. 17, 2008, now Pat. No. 8,785,042, said application No. 13/308,704 is a continuation-in-part of application No. PCT/EP2011/060681, filed on Jun. 27, 2011.

(60) Provisional application No. 60/897,823, filed on Jan. 29, 2007, provisional application No. 60/929,613, filed on Jul. 5, 2007, provisional application No. 61/359,484, filed on Jun. 29, 2010.

(51) Int. Cl.

| | | |
|---|---|---|
| *H01M 4/36* | (2006.01) | |
| *H01M 10/0525* | (2010.01) | |
| *H01B 1/08* | (2006.01) | |
| *H01M 4/505* | (2010.01) | |
| *C01G 53/00* | (2006.01) | |

(52) U.S. Cl.
CPC ......... *H01M 4/505* (2013.01); *H01M 4/525* (2013.01); *H01M 10/0525* (2013.01); *C01P 2002/32* (2013.01); *C01P 2002/50* (2013.01); *C01P 2002/72* (2013.01); *C01P 2002/76* (2013.01); *C01P 2002/77* (2013.01); *C01P 2002/85* (2013.01); *C01P 2004/03* (2013.01); *C01P 2004/50* (2013.01); *C01P 2004/51* (2013.01); *C01P 2004/52* (2013.01); *C01P 2004/53* (2013.01); *C01P 2004/61* (2013.01); *C01P 2006/40* (2013.01); *Y10T 428/2982* (2015.01)

(56) References Cited

U.S. PATENT DOCUMENTS

| | | | |
|---|---|---|---|
| 6,372,385 | B1 | 4/2002 | Kweon et al. |
| 7,078,128 | B2 | 7/2006 | Lu et al. |
| 2006/0071198 | A1 | 4/2006 | Paulsen et al. |
| 2006/0257745 | A1 | 11/2006 | Choi et al. |
| 2007/0218363 | A1 | 9/2007 | Paulsen et al. |
| 2009/0220860 | A1 | 9/2009 | Xi et al. |
| 2010/0112445 | A1 | 5/2010 | Park et al. |

FOREIGN PATENT DOCUMENTS

| | | |
|---|---|---|
| EP | 1716609 | 7/2005 |
| JP | 2008-198432 | 8/2008 |
| KR | 20010002784 | 1/2001 |
| WO | WO 2004/040677 | 5/2004 |
| WO | WO 2005/056480 | 6/2005 |
| WO | WO 2005/064715 | 7/2005 |
| WO | WO 2008/092568 | 8/2008 |

* cited by examiner

Figure 1A  LCO-1               Figure 1B  Example 1a
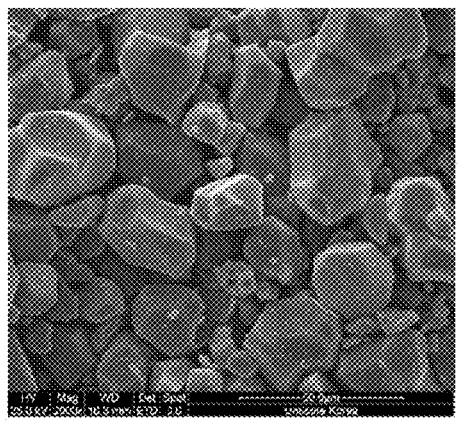 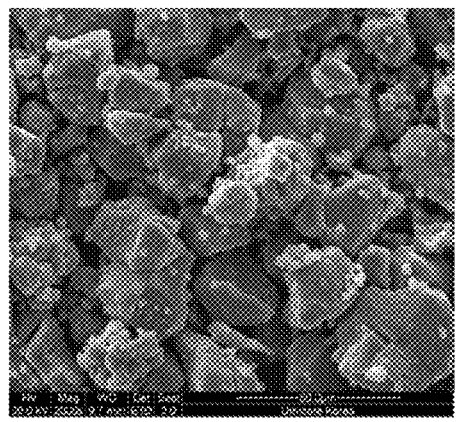
Figure 2
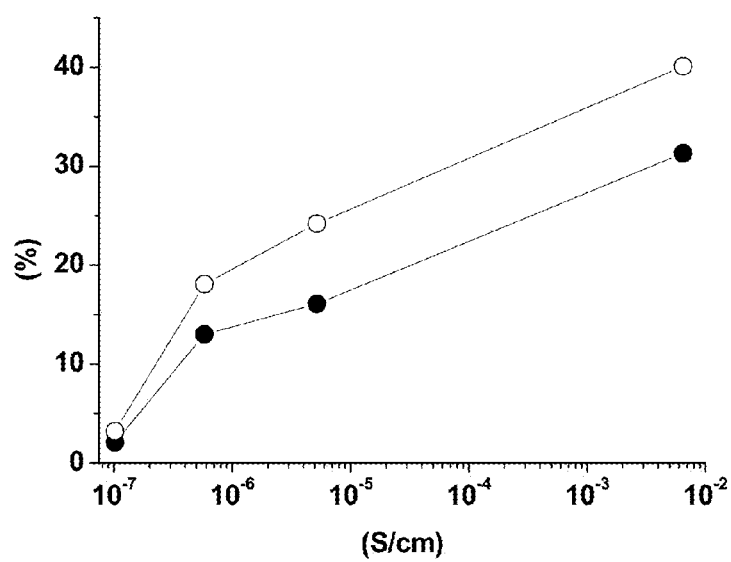

Figure 3A  LCO-3
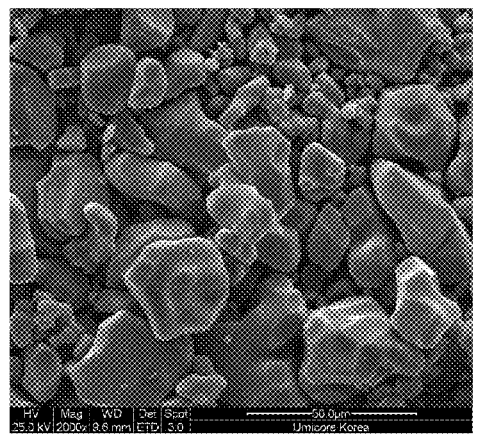
Figure 3B  Example 2d
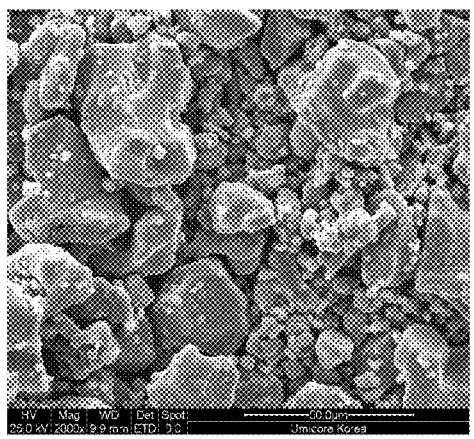 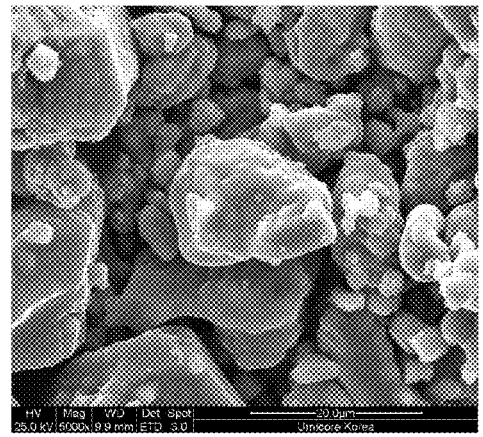

Figure 8A  LCO-5
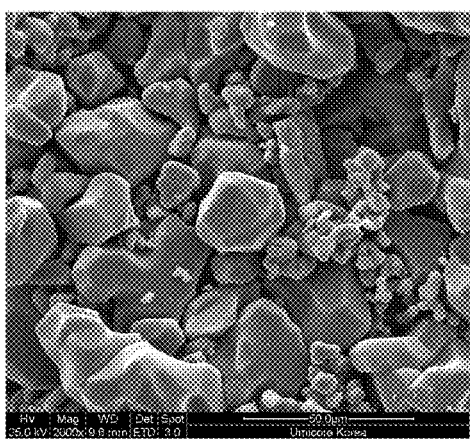
Figure 8B  Ex 5a
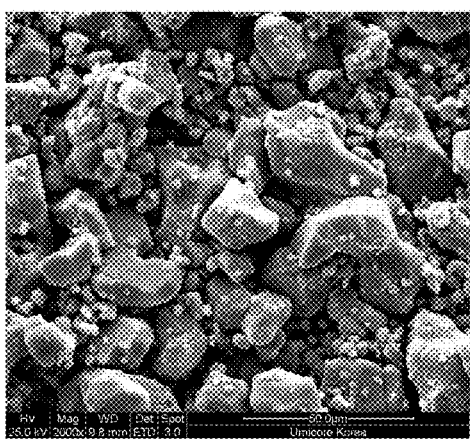 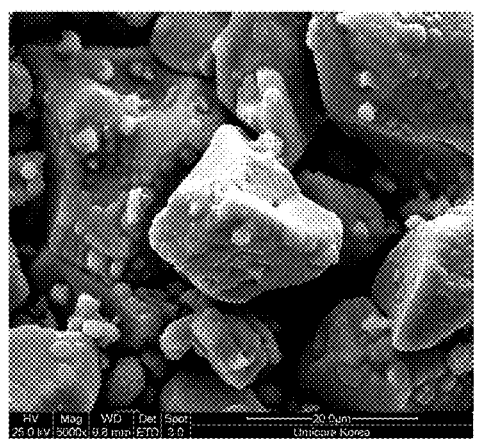

Figure 8C  CEx 5b
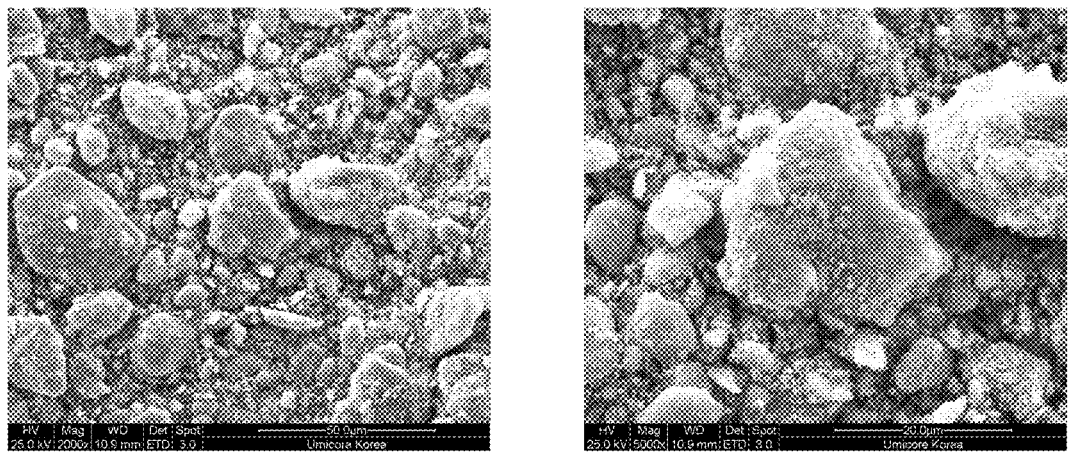
Figure 9
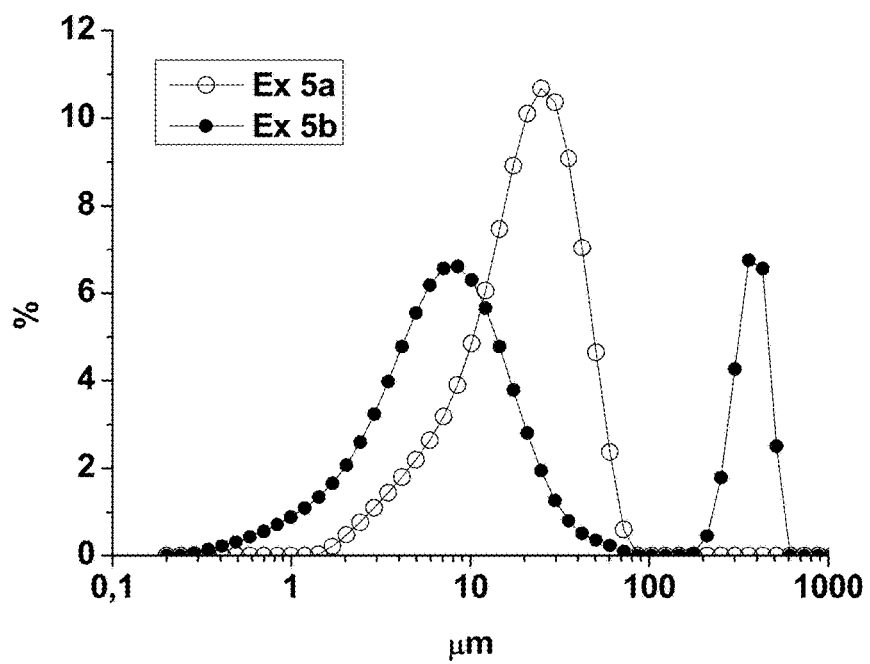

CATHODE MATERIAL FOR LITHIUM-ION RECHARGEABLE BATTERIES

This application is a continuation-in-part of U.S. patent application Ser. No. 13/308,704, filed Dec. 1, 2011, which is a continuation-in-part of U.S. patent application Ser. No. 12/374,532, filed Jan. 21, 2009, which is a national stage application of PCT/EP2008/000313, filed Jan. 17, 2008, which claims the benefit of U.S. Provisional Application No. 60/897,823, filed Jan. 29, 2007, European Patent Application No. 07012789.9, filed Jun. 29, 2007, and U.S. Provisional Application No. 60/929,613, filed Jul. 5, 2007, the entire contents of each of which is hereby incorporated by reference. U.S. patent application Ser. No. 13/308,704 is also a continuation-in-part of PCT/EP2011/060681, filed Jun. 27, 2011, which claims priority to U.S. Provisional Application No. 61/359,484, filed Jun. 29, 2010, the entire contents of each of which is hereby incorporated by reference.

BACKGROUND OF THE INVENTION

The present invention relates to a powderous lithium transition metal oxide, containing a special type of Mn and Ni bearing $LiCoO_2$ (also referred to as LCO in this description). The cathode powder can be prepared at large scale by a low-cost process. More specifically, the preparation is the sintering of a mixture of a cobalt containing precursor, like $LiCoO_2$, a Ni—Mn—Co containing precursor, like mixed hydroxide MOOH, and $Li_2CO_3$. The sintering temperature is high enough to allow for an exchange of cations between the $LiCoO_2$ and Li—Ni—Mn—Co oxide phases being formed, which results in a very specific morphology with a compositional gradient of the different transition metals. The lithium transition metal oxide powder can be used as a cathode active material in rechargeable lithium batteries.

Despite of some inherent limitations like poor safety and high cost $LiCoO_2$ still is the most applied cathode material for rechargeable lithium batteries. There is a strong demand driven by customer expectation to increase the energy density of rechargeable lithium batteries. One way to improve the energy density is to increase the charge voltage, which requires more robust cathode materials which can be charged at higher voltage. Problems which appear or become more severe if the charging voltage is increased are (a) low safety, (b) poor storage properties during storage of charged batteries at elevated temperature and (c) poor cycling stability. Numerous approaches have been disclosed to address these problems. Partial improvements have been achieved but the basic problems have not been fully resolved.

Beside the demand to increase the energy density, it is essential that rechargeable batteries meet the power requirements. That means that the battery as a whole and particularly the active cathode material itself has a sufficient high rate performance.

There exist general trends. Careful studying of published results on cathode materials allows to better understand the limitations of $LiCoO_2$ based rechargeable lithium batteries.

One basic limitation originates from the surface area dilemma. Increase rate performance (i.e. high power) can be met by increasing the surface area because the solid-state lithium diffusion length can be decreased; which results in an improved rate performance. However, a high surface area increases the area where unwanted side reactions between electrolyte and charged cathode take place. These side reactions are the course of poor safety, poor cycling stability at elevated voltage and of poor storage properties of charged cathode at elevated temperature. Furthermore, high surface area materials tend to have a low packing density which reduces the volumetric energy density.

Another basic limitation originates from the cobalt stoichiometry. Lithium-nickel-manganese-cobalt oxide based cathode materials (like $LiMn_{1/3}Ni_{1/3}Co_{1/3}O_2$) have higher stability against reactions between electrolyte and cathode than $LiCoO_2$, and the raw material cost is lower, but these materials suffer from a lower volumetric energy density and these materials typically have a lower lithium diffusion constant.

It can be concluded that there exist basic limitations in:
Surface area: Low surface area cathode materials are desired to achieve high safety, improved density and high stability during storage; however, the surface area cannot be lowered too much because this will lower the rate performance.
Composition: $LiMO_2$ cathodes, where M dominantly is cobalt is desired to achieve high lithium diffusion rate and high volumetric energy density; however a high content of cobalt causes poor safety properties, increased cost and an inferior high voltage stability.

A solution to this dilemma would be to increase the diffusion constant. Increased D would allow to lower the surface area without losing rate performance.

$LiMO_2$, where M=Ni—Mn—Co with Ni:Mn>1, has been previously disclosed. U.S. Pat. No. 6,040,090 (Sanyo), for example, discloses a wide range of compositions $LiMO_2$ (M=Mn, Ni, Co) including $LiMO_2$ with Ni:Mn>1. The patent application discloses that $LiMO_2$ has a high degree of crystallinity (small HWFM of peaks in the X-ray diffraction pattern). $LiCoO_2$ doped with Ni and Mn has for example been disclosed in U.S. Pat. No. 7,078,128. U.S. Pat. No. 7,078,128 discloses $LiCoO_2$, doped by equal amounts of Ni and Mn is a preferred implementation.

European patent application EP1716609 A1 discloses a $LiMO_2$ based active cathode material where the composition of the particles depends on the size of the particles, particularly, the cobalt content of particles decreases with decreasing size of the particles. The decrease of cobalt content originates from core-shell structured particles, where the Mn—Ni containing shell has the same thickness, covering a $LiCoO_2$ core. As a result, if the particles are small, the $LiCoO_2$ core is small and the cobalt content of the whole particle is low.

European patent application EP1556915 A1 discloses a $LiMO_2$ with a gradient of transition metal composition. The gradient originates from a mixed hydroxide shell, covering the core which has significantly different metal composition. In a preferred implementation the core is $LiCoO_2$. After sintering a gradient of transition metal composition with a radial change of stoichiometry is achieved, and a $LiMO_2$ shell covers a $LiCoO_2$ based core. During sintering, cobalt diffuses from the $LiCoO_2$ core to the $LiMO_2$ shell. At the same time much less Ni diffuses from the $LiMO_2$ shell into the $LiCoO_2$ core. Therefore the shell swells and the $LiCoO_2$ core contracts. A swelling shell covering a shrinking core typically causes the creation of voids between shell and core. These voids are highly undesired.

It is an object of the present invention to define a cathode material having a high rate performance, and showing high stability during extended cycling at high charge voltage. The high temperature storage properties are also improved.

BRIEF DESCRIPTION OF THE DRAWINGS

FIG. 1a is an SEM image of LCO-1 powder.
FIG. 1b is an SEM image of Example 1a powder.

FIG. 2 is a graph illustrating the relationship between electrical conductivity and cycling stability at 4.5V for Example 1.

FIG. 3a is an SEM image of LCO-3 powder.

FIG. 3b is an SEM image of Example 2d powder.

FIG. 8a is an SEM image of LCO-5.

FIG. 8b is 2 SEM images of Example 5a.

FIG. 8c is an SEM image of Counter Example 5b.

FIG. 9 is a graph illustrating the particle size distributions measured by laser diffraction in dry medium of Ex 5a and 5b.

SUMMARY OF THE INVENTION

Figure 4A:
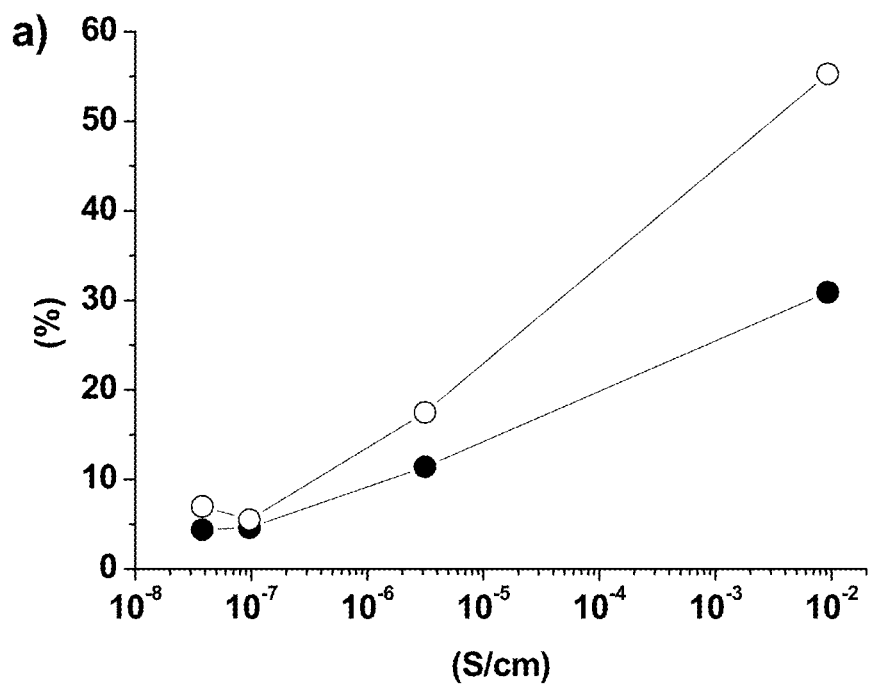
FIGS. 4a and b are graphs illustrating the relationship between electrical conductivity and cycling stability at 4.5V for Example 2.

Viewed from a first aspect, the invention can provide a lithium metal oxide powder for use as a cathode material in a rechargeable battery, consisting of a core and a surface layer, the lithium metal oxide having the general formula $Li_x(Co_aM_bA_c)_{2-x}O_{2\pm\delta}$, with $x \leq 0.995$, $b>0$, $c \geq 0$, $a+b+c=1$, $|\delta| \leq 0.1$ ($|\delta|$=absolute value of $\delta$), $M=(Mn_mNi_n)$ with $m+n=1$, A is a dopant, wherein the surface layer comprises either one or both of a cubic phase oxide having a crystal structure with a Fm-3m space group, and a cubic phase oxide having a crystal structure with a Fd-3mS space group. In the formula, n may be greater than or equal to m. Also, at the surface of the powder the molar ratio Ni:Mn may be >1, said surface Ni:Mn molar ratio being greater than the molar ratio n/m. In different embodiments, either $x \geq 0.970$ or $0.974 \leq x \leq 0.993$. In an embodiment, $0<c \leq 0.03$, and A is either one or more dopants selected from the group consisting of Mg, Ti, Al and Zr. In another embodiment, the cubic phase oxide having a crystal structure with a Fm-3m space group has a lattice constant a with $4.05 <= a <= 4.30$ or even $4.13 <= a <= 4.20$, and the cubic phase oxide having a crystal structure with a Fd-3mS space group has a lattice constant a with $8.055 <= a <= 8.150$ or even $8.055 <= a <= 8.110$, a being expressed in Å. In the lithium metal oxide powder the amount of cubic phase oxide in the powder may be between 0.1 and 3 wt %. The powder may have an electrical conductivity of less than $10^{-5}$ S/cm or even less than $10^{-8}$ S/cm when pressed with 63.7 MPa at 25° C. In an embodiment, at least 98 mol % of the metals in both the surface layer and the core consist either of the elements Li, Mn, Ni and Co, or of the elements Li, Mn, Ni, Co and either one or both of Mg and Al. It may also be that the surface layer comprises more Mn than the core, and the surface layer comprises less Co than the core. In another embodiment the surface layer consists of Mn and Ni enriched islands, the islands having a Mn and Ni concentration that is higher than in the bulk of the particles, and the islands comprising at least 5 mol %, and preferably at least 10 mol % of Mn.

Viewed from a second aspect, the invention can provide an electrochemical cell comprising a cathode comprising as active material the lithium metal oxide powder according to the invention.

Viewed from a third aspect, the invention can provide a method for preparing a lithium metal oxide powder according to the invention, comprising the steps of:
providing a mixture of a doped or undoped $LiCoO_2$ powder, a Ni—Mn—Co comprising powder, and a Li-comprising compound,
the mixture comprising more than 90 wt % of the doped or undoped $LiCoO_2$ powder, and
sintering the mixture at a temperature T of at least 910° C., for a time t between 1 and 48 hrs,
wherein the quantity of the Li-comprising compound in the mixture is selected to obtain a Li over metal ratio in the lithium metal oxide powder with Li:M≤0.99.

In this method it may be that either the mixture further comprises a compound comprising the dopant A, or the Ni—Mn—Co comprising powder further comprises the dopant A. In an embodiment, the quantity of the Li-comprising compound in the mixture is selected to obtain a Li over metal ratio in the lithium metal oxide powder with 0.95≤Li:M≤0.99. In another embodiment, the Ni—Mn—Co comprising powder may be either a Ni—Mn—Co hydroxide, a Ni—Mn—Co oxyhydroxide or a mixture of both.

In still another embodiment, the doped $LiCoO_2$ powder comprises either one or more of Al, Mg and Ti and is prepared by sintering a mixture of $Li_2CO_3$ and either $Co(OH)_2$ or $Co_3O_4$, the $Co(OH)_2$ or $Co_3O_4$ being doped with either one or more of Al, Mg and Ti.

The measurement of the electrical conductivity is performed under an applied pressure of 63.7 MPa. In the description and claims the value of 63 MPa is also mentioned as round-off, when the actual pressure of 63.7 MPa is applied. In the description and claims, d50 is defined as 50% of the volume of the powder consisting of particles with a size less or equal to the d50 value, where d50 is measured by a suitable known method such as laser diffraction in a dry or wet medium.

DETAILED DESCRIPTION

The cathode material of the actual invention is a powder, containing modified and doped $LiCoO_2$ as the main phase and mostly, but not exclusively, a second transition metal phase. Both phases are lithium-transition-metal oxide phases with a dominant layered crystal structure: ordered rocksalt type crystal structure—space group r-3m. The first phase originates from the $LiCoO_2$ precursor and is a modified and doped $LiCoO_2$. The composition can be defined as a doped lithiated $Co_{1-a-b}Ni_aMn_b$-oxide with a≥b, $0.03<a+b<0.5$ and preferably $0.1<a+b<0.5$. In an embodiment the dopants are either one or more of Al, Mg and Ti. The formula is idealized and does not take account of small possible deviations like lithium excess or deficiency, oxygen non-stoichiometry or doping as described above. By oxygen non-stoichiometry is understood that the formula may become $LiCoO_{2\pm\delta}$, with $|\delta| \leq 0.1$. Preferably the $LiCoO_2$ based particles are monolithic. A monolithic particle does not exhibit inner porosity, and it does not consist of agglomerates of smaller primary particles. One aspect of the invention is that different particles of the $LiCoO_2$ phase have not exactly the same composition. The actual composition of a particle depends on how much nickel and manganese has diffused into the LiCoO$_2$ particle during sintering. The Ni and Mn originate from the precursor of the second phase which typically is a mixed hydroxide. The amount of Mn and Ni which diffuses into the LiCoO$_2$ based phase during sintering, besides many other factors like temperature, Li:M ratio, etc., strongly depends on the arrangement of neighboring Ni—Mn based particles and the contact area and contact pressure. As a result, different LiCoO$_2$ particles have a different composition.

A second aspect of the invention is that the metal composition of single LiCoO$_2$ based particles is not homogeneous. Typical particles have an island like surface morphology, the islands originating from smaller Ni—Mn based particles or crystallites, densely sintered to the surface of the LiCoO$_2$ particle. The islands have a higher concentration of manganese than the areas further apart from the island, or the regions in the inside of the particle. The existence of the island morphology is an inherent feature of the cathode material of the actual invention. These islands—being centers with higher manganese content—cannot be separated from the particle. They are densely and continuously connected with the bulk of the LiCoO$_2$ particle. Hence the manganese stoichiometry—with increasing distance from the island—decreases, possibly in a gradient-like manner and approaches zero in the inside of the particles or on the surface in-between distant islands. The inventors observed that the island morphology is related to the high observed rate performance of the disclosed cathode materials. The authors speculate that the islands—if they were not connected to the LiCoO$_2$ particles—would have different crystal lattice constants. However, the island is densely connected to the doped LiCoO$_2$, and between LiCoO$_2$ particle and island a region of manganese stoichiometry gradient exists. Therefore the island as well as the particles will undergo strong lattice strain. The strain somehow—the exact mechanism is unknown to the authors—enables a significantly faster diffusion of lithium into the particle.

A second phase is LiM'O$_2$ with M'=Ni$_m$Mn$_n$Co$_{1-m-n}$, m≥n, 0.1<m+n<0.9 The formula is idealized and does not take account of small possible deviations as lithium excess or deficiency, oxygen non-stoichiometry or doping as described above. The second phase preferably originates from a Ni—Mn—Co containing precursor like mixed hydroxide, mixed oxihydroxide, mixed oxide, mixed lithium metal oxide or mixed carbonate. During the sintering, the metal composition of the second phase changes. Cobalt diffuses from the LiCoO$_2$ particles into the LiM'O$_2$ particles. Some Ni and Mn diffuses out of the LiM'O$_2$ particles into the LiCoO$_2$ particles. As a result, the cobalt stoichiometry of the second phase is higher than the cobalt stoichiometry of the Ni—Mn—Co containing precursor. The change of cobalt stoichiometry is an important aspect of the invention. Only if the cobalt stoichiometry increases significantly during sintering, enough exchange of cations has taken place and only in this case the rate performance of the resulting cathode is sufficiently improved.

The inventors have made two more surprising observations, which are believed to be further essential aspects of the invention:

First observation: The fraction of second phase increases during sintering. Apparently, more cobalt diffuses into the second phase (LiM'O$_2$) than nickel and manganese diffuses into the LiCoO$_2$ phase. The inventors speculate that this difference in diffusion enhances the observed island morphology. Related to this observation is a clear change of voltage profile. A mixture of LiCoO$_2$ and LiM'O$_2$ has a characteristic voltage profile with a plateau at 3.88 V. With increased cation exchange the authors observed a disappearing of the 3.88 V plateau together with a lowering of the end-of discharge voltage. Furthermore, cobalt does not only diffuse into the LiM'O$_2$ particles but also into the manganese containing regions on the surface; during this process the areas between the island act as Co source. At the same time the island itself is a cobalt sink. In a simple picture—the manganese containing island swells with cobalt like a sponge would swell by removing water from its surrounding. This process explains why the islands morphology is created.

Second observation: The first phase has a composition which clearly differs from pure LiCoO$_2$. A large fraction of particles of the first phase contains at least 3 percent, more preferably 10% of manganese and nickel. Such a change of stoichiometry is usually accompanied by a significant change of lattice constants. However, X-ray diffraction analysis surprisingly shows that the lattice constants of the first phase (obtained from a two-phase Rietveld refinement) basically have not changed—they remain identically to those of LiCoO$_2$. The inventors believe that this is a very important aspect of the invention which shows that the improvement of rate performance of the first phase is not caused by the creation of a solid state solution between LiCoO$_2$ and LiM'O$_2$. (A solid state solution shows a gradual change of lattice constants depending on the composition.)

A further aspect of the invention is that the LiM'O$_2$ particles (second phase) have crystallites, the size of the crystallites correlates with the cobalt content. Apparently, during sintering, as more Ni (and Mn) diffused away from the LiM'O$_2$ into the LiCoO$_2$ particles, and as more Co diffuses into the LiM'O$_2$ particles, an acceleration of crystallite growth is caused. As a result, LiM'O$_2$ particles (second phase) with higher cobalt stoichiometry have larger primary crystallites. This is a very useful process because in a self-organized manner, an optimized morphology is achieved. This is because an increased content of cobalt causes a faster lithium diffusion, which allows for larger crystallites without losing rate performance. The correlation between high cobalt content and larger size however only refers to the size of crystallites, not to the size of particles. It is likely that large particles in average have a lower cobalt stoichiometry than small particles, because more cobalt has to diffuse a longer pathway.

The inventors understand the reactions which cause the island morphology as follows: during sintering, a significant fraction of the smaller and agglomerated LiM'O$_2$ particles is in contact with the LiCoO$_2$ particles. The contact points are the cobalt sinks, and manganese containing islands, inherently embedded on the surface of the LiCoO$_2$ particle are formed. At the same time, nickel (and some manganese) diffuses into the LiCoO$_2$ and cobalt diffuses into the LiM'O$_2$ particle. During sintering, the density of the agglomerated LiM'O$_2$ particles, caused by the up-take of cobalt and due to thermal sintering, increases. During the densification, the contact between the swelling island and the LiM'O$_2$ particle is lost and the final cathode, consisting of particles of two different phases is achieved.

The loss of contact between LiM'O$_2$ and LiCoO$_2$ is easier if the LiM'O$_2$ particle is agglomerated. In this case only a part of the LiM'O$_2$ particle is consumed and forms the seed for the island. Alternatively, no loss of contact is required if the Ni—Mn—Co precursor has very small particles with a d50 of less than 1-2 micrometer. In this case, a large fraction or even the totality of the Ni—Mn—Co particles is consumed to form the seed of the island. As a consequence, different implementations of the actual invention are possible.

First typical implementation: it may be that the Ni—Mn—Co precursor consists of agglomerated crystallites. An example is a mixed hydroxide, where secondary particles consist of not too dense agglomerates of primary particles. Very dense and large Ni—Mn—Co precursors are less suitable. A preferred particle size distribution has a d50 of 4-8 micrometer. In this case LiM'O$_2$ particles are small enough to (a) support a very high rate and (b) they fit nicely in-between the voids of the larger LiCoO$_2$ particles which allows for low porosity electrodes and a high volumetric energy density.

The precursor for the first phase (doped LiCoO$_2$) may be monolithic, dense and having much larger size than the precursor for the second phase (LiM'O$_2$) which is agglomerated, less dense and has smaller size. A preferred precursor for the first phase is LiCoO$_2$ with dense monolithic particles of at least 10-20 micrometer. Many commercial LiCoO$_2$ materials have this desired morphology. Alternatively, cobalt hydroxide, cobalt oxyhydroxide, cobalt oxide or cobalt carbonate is a suitable precursor if it has large particles (at least 10-20 micrometer) and high density. As an example—cobalt hydroxide or oxyhydroxide with roughly spherical particles and a tap density above 2.0 g/cm$^3$ and a d50 of the particle size distribution larger than 15-20 micrometer is a suitable precursor.

The cobalt precursor may consist of large particles (d50>10-20 micrometer) which are dense and monolithic. Suitable cobalt precursors are commercial LiCoO$_2$, or high density (tap density >2 g/cm$^3$) cobalt hydroxide, oxyhydroxide or carbonate. Suitable shapes of the precursors are spherical or irregularly potato shaped particles, for example.

The reaction—formation of a manganese containing island, accompanied by cation exchange between cobalt and nickel—is the same in both implementations. The inventors believe that an essential aspect which causes the formation of the island morphology is the lower mobility of (4 valent) manganese compared to that of 3 valent nickel in LiCoO$_2$ and 3 valent cobalt in LiM'O$_2$. Also, the (4 valent) manganese does not take part in the electrochemical insertion/extraction of lithium during charge/discharge of the batteries some of the manganese can be replaced by other cations. A suitable cation is also titanium. Similar as manganese it is electrochemically inert, has low mobility and it can be doped into a Ni—Mn—Co precursor. For example, similar as manganese, titanium can be doped into LiNiO$_2$.

Another important aspect of the invention is that a high rate performance is achieved even if the cathode material is slightly lithium sub-stoichiometric. We observed that the highest rate performance is achieved if the total lithium content per transition metal was approx. 0.98, i.e. less than unity. This is very surprising, because in the case of lithium transition metal oxides Li$_{1+z}$M$_{1-z}$O$_2$ where M contains nickel it is widely accepted that a lithium deficiency causes cation mixing (that are nickel atoms misplaced on crystallographic lithium sites), and the increased cation mixing causes a poor rate performance.

The present invention discloses a strategy to obtain high voltage stable and high rate capable LiCoO$_2$ based cathodes. The obtained LiCoO$_2$ based cathode materials have a high density and can be cycled in a stable manner in real cells at high voltage. A key point of the strategy is to achieve very low electrical conductivity, orders in magnitude lower than reported for other current cathode materials.

It is widely accepted that a sufficient electrical conductivity is required when targeting high performance cathode performance. A typical example is the use of carbon coated fine particle LiFePO$_4$. Without carbon coating the capacity and rate performance is very poor. In the case of LiFePO$_4$ a typical target for conductivity of pressed cathode powder is $10^{-3}$ to $10^{-2}$ S/cm. Other cathode materials have relatively high electrical conductivity as well.

The electrical conductivity of different reference materials was measured using pressed pellets at a pressure of 63.7 MPa at room temperature. With a typical electrolyte ionic conductivity of 10 mS/cm ($10^{-2}$ S/cm) we can define cathodes having similar or higher electrical conductivity as being "high conductive"; if the conductivity is greater than to about 1% of that value ($10^{-4}$ S/cm) we define it as "low conductive". If the conductivity is less than 0.1% ($10^{-5}$ S/cm) the cathode can be defined as "insulating". It is generally accepted that cathodes must at least have low conductivity, and insulating cathodes cannot work well.

High Ni materials like LiNi$_{0.8}$Co$_{0.15}$Al$_{0.05}$O$_2$ for example have about $3.47*10^{-2}$ S/cm, LMNCO (LiNi$_{0.5}$Mn$_{0.3}$CO$_{0.2}$O$_2$) has about $2.21*10^{-3}$ S/cm, the famous "111" (Li$_{1+x}$M$_{1-x}$O$_2$ with M=Ni$_{1/3}$Co$_{1/3}$Mn$_{1/3}$ and x≅0.05 has about $2.03*10^{-4}$ S/cm. Commercial LiCoO$_2$ has a relatively low electrical conductivity in the range of $10^{-2}$ to $10^{-3}$ S/cm. For all of these cathode materials conductivities above $10^{-5}$ S/cm are measured. Thus none of these cathodes is insulating.

The cathode materials of the present invention are "insulating" using the above described definition. They have conductivities which are at least 2-3 orders lower than those of the least conductive currently known cathode material. It is believed that the low conductivity is the main reason for the high voltage stability of the new insulating cathode materials. That such insulating cathodes can yield excellent electrochemical performance, namely large discharge capacity and rate performance, is a surprise because it is commonly accepted that a certain electrical conductivity is needed for the Li cation diffusion within the solid cathode and across the interface between electrolyte and cathode.

When a LiCoO$_2$ based cathode is charged to high voltage—meaning the cathode is strongly de-intercalated—we achieve a Li$_x$CoO$_2$ composition where most of the Co is in the 4 valent state. Tetravalent Li$_x$CoO$_2$ is a very strong oxidizer and highly reactive. The electrolyte is thermodynamically not stable in contact with such an oxidizing surface. A reaction with the electrolyte (being the reducing agent) is strongly preferred energetically. Even at low temperature—during normal cycling of a LiCoO$_2$ cathode at high voltage—this reaction proceeds slowly but continuously. Reaction product covers the cathode surface and electrolyte is decomposed, and both effects continuously cause a deterioration of electrochemical performance of the battery; a loss of capacity and a strong increase of resistance—by polarization—is observed.

The situation for high voltage charged cathodes is not so different to those of the well investigated carbon anode. The electrolyte is not stable at the reducing conditions during Li intercalation where the potential is near zero V (versus Li/Li+). Thus the electrolyte decomposes and becomes reduced. In this case, however, the decomposition products of electrolyte with lithium form the so-called SEI (solid electrolyte interface). It is generally accepted that the SEI is an ionic conductor but electronic insulator. Thus the SEI still allows for Li transport across the surface between solid and electrolyte but it prevents further reduction of the electrolyte. The key point is that the reduction of electrolyte locally requires the simultaneous presence of a Li cation as well as an electron. The Li cation is present in the electrolyte and the electron in the carbon bulk. If, however, the SEI, as electronic insulator physically separates the electrons in the carbon from the Li cations in the electrolyte then further electrolyte reduction is not possible.

This mechanism is well known and it has been tried to apply a similar mechanism to the cathode. Much research focused on electrolyte additions which would decompose on the cathode surface to form a cathode SEI. However, the search for electrode additives which form a SEI at high voltage when in contact with a highly oxidized (i.e. delithiated) cathode has been not or only partially successful.

Obviously, an electronically insulating cathode material will solve this problem. If an electronically insulating cathode material could be successfully cycled, then we would expect a high voltage stability because the oxidation of the electrolyte requires that an electron is supplied to the cathode. It is however generally assumed up to now that such an insulating cathode could not have good electrochemical performance.

The current invention is based on the discovery that
1) insulating cathodes can have high voltage stability and
2) it is possible to achieve insulating cathodes which nevertheless show very good electrochemical performances.

Hence, an example pressed powder of the cathode, such as disclosed below, shows very low conductivity, practically being a good insulator. But, surprisingly, the cathode shows excellent electrochemically performance. Furthermore, measurements show that the bulk of the cathode particles is conductive whereas the surface is insulating.

In one embodiment, in order to achieve good performance, the lithium metal oxide powder particles may have the following characteristics:
1) a core-shell structure where the shell is electronically insulating and the core is electronically conducting,
2) an insulating shell that does not cover the core completely, typically much more than 50% but less than 100%, and
3) a shell that dominantly consists of transition metal.

A further important aspect of the invention is that the inner core of the particles has higher conductivity than the outside region. In a typical implementation of the invention the outside is richer in manganese than the inside region. We observe a high electrochemical performance despite that the outside of the $LiCoO_2$ particles is covered by a non-conductive shell.

An exemplary morphology of cathodes of the present invention is as follows: a relatively conductive core is mostly, but not to 100%, covered by an insulating shell. Furthermore, the insulating shell dominantly can consist of transition metal oxides where the metal composition comprises at least 95% cobalt, manganese and nickel.

The presence of a core shell structure is however only one of the embodiments of the invention, which is especially observed in powders that have large average particle sizes, such as at least 10 µm, or even at least 20 µm. The claimed process allows obtaining the lowest possible electrical conductivity independently of the obtained structure. By varying the Li:metal blend ratio, cathodes with different electrical conductivity are achieved. The Li:metal ratio according to one embodiment is the ratio which results in minimum electrical conductivity. High voltage stable cathodes are those cathode materials which have the minimum conductivity as function of Li:metal ratio.

The invention may be practiced, for example, by way of the different examples described below.

Example 1

This example demonstrates that cycle stability improves as electrical conductivity decreases. The improved stability and decrease of conductivity is achieved by optimizing the Li:metal ratio.

Preparation of LCO-1: 0.25 mol % titanium and 0.5 mol % magnesium doped $Co(OH)_2$ is prepared in a pilot line, as precursor for $LiCoO_2$. Titanium and magnesium doped $LiCoO_2$ (noted LCO-1) is obtained by means of a standard high temperature solid state synthesis by mixing the precursor with $Li_2CO_3$ to achieve an average particle size of 25 µm.

Preparation of island-coated LCO-1: A cathode powder material is prepared by mixing 95 wt. % of titanium and magnesium doped $LiCoO_2$ (LCO-1), with 5 wt. % of MOOH mixed transition metal oxy-hydroxide with $M=Ni_{0.55}Mn_{0.30}Co_{0.15}$ and either none or pre-determined amounts of $Li_2CO_3$. Examples 1a, 1b and 1c are prepared according to Table 1 and sufficiently mixed to prepare a homogeneous raw material mixture. The mixture is placed in an alumina crucible and heated at 1000° C. for 8 h under constant air flow. After cooling, the resulting powder is sieved and characterized by means of 4-probe DC-conductivity and further fitted in a coin cell for electrochemical characterization.

TABLE 1

Composition of blend for Examples 1a, 1b and 1c obtained from LCO-1. The Li/M molar ratio relates the Li addition through $Li_2CO_3$ to the transition metal content in $LiCoO_2$ (LCO-1) and MOOH together (with M = Ni, Mn and Co).

|  | $LiCoO_2$ (g) | MOOH (g) | $Li_2CO_3$ (g) | Li (in $Li_2CO_3$) to transition metal molar ratio |
| --- | --- | --- | --- | --- |
| Example 1a | 150.00 | 7.59 | 0 | 0 |
| Example 1b | 150.00 | 7.59 | 0.57 | 0.0094 |
| Example 1c | 150.00 | 7.59 | 1.13 | 0.0187 |

Table 2 summarizes the electrical conductivity under an applied pressure of 63 MPa and electrochemical performances of Examples 1a, 1b and 1c and of LCO-1. SEM images of LCO-1 and Example 1a are displayed on FIG. 1. The morphology of the two products is very different: LCO-1 has non agglomerated particles with smooth surface whereas Example 1a has a particular island coating at the surface of $LiCoO_2$ particles.

TABLE 2

Electrical conductivity and electrochemical performances at 4.5 V of Examples 1a, 1b and 1c and of LCO-1.

| | Discharge capacity 0.1 C at 4.5 V (mAh/g) | Discharge capacity 1 C at 4.5 V (mAh/g) | Rate performance 3 C (%) | Capacity fading 1 C (%) | Energy fading 1 C (%) | Electrical conductivity (S · cm$^{-1}$) |
|---|---|---|---|---|---|---|
| LCO-1 | 179.9 | 164.8 | 79.0 | 31.3 | 40.1 | 6.49 * 10$^{-3}$ |
| Example 1a | 183.8 | 181.1 | 92.6 | 2.1 | 3.2 | 1.02 * 10$^{-7}$ |
| Example 1b | 186.4 | 183.1 | 95.1 | 13.0 | 18.1 | 5.83 * 10$^{-7}$ |
| Example 1c | 186.3 | 181.5 | 93.0 | 16.1 | 24.2 | 5.21 * 10$^{-6}$ |

The relationship between electrical conductivity and cycling stability at 4.5V is illustrated on FIG. 2. The electrical conductivity of the coated samples (i.e. Examples 1a to 1c) is 3 to 4 orders of magnitude lower than for uncoated LCO-1. Electrochemical properties such as discharge capacity, rate performance, capacity fading and energy fading of LCO-1 are very poor. Examples 1a to 1c feature dramatic improvements of these properties compared to LCO-1. For Examples 1a to 1c, the electrical conductivity increases upon lithium addition. At the same time, both capacity fading and energy fading are impaired. The decrease of resistivity correlates well with 4.5V stability improvements for both coated and uncoated samples. Examples 1 a, b & c are insulating and are examples of an embodiment of the invention.

In this and all of the following examples, the electrochemical performance is tested in coin type cells, with a Li foil as counter electrode in a lithium hexafluorite (LiPF$_6$) type electrolyte at 25° C. The active material loading weight is in the range of 10 to 12 mg/cm$^2$. Cells are charged to 4.3 V and discharged to 3.0 V to measure rate performance and capacity. The high voltage discharge capacity and capacity retentions during extended cycling are measured at 4.5V or 4.6V (in Examples 3-4 & 9) charge voltage. A specific capacity of 160 mAh/g is chosen for the determination of the discharge rates. For example, for the discharge at 2 C, a specific current of 320 mA/g is used.

This is an overview of the test that is used for all of the coin or full cells in Examples 1-3 and 5:

| Cycle | Charge | Discharge | Purpose of test |
|---|---|---|---|
| 1 | 4.3 V, 0.1 C | 3.0 V, 0.1 C | Voltage profile |
| 2-6 | 4.3 V, 0.25 C | 3.0 V, 0.2, 0.5, 1, 2, 3 C | Rate performance |
| 7, 31 | 4.5 V (or 4.6 V), 0.25 C | 3.0 V, 0.1 C | Slow reference cycle before and after stability, cycle 7 gives the discharge capacity 0.1 C at 4.5 V (or 4.6 V) |
| 8, 32 | 4.5 V (or 4.6 V), 0.25 C | 3.0 V, 1 C | Fast reference cycle before and after stability, cycle 8 gives the discharge capacity 1 C at 4.5 V (or 4.6 V) |
| 9-30 | 4.5 V, 0.25 C | 3.0 V, 0.5 C | Stability test |

The following definitions are used for data analysis: (Q: capacity, D: Discharge, C: Charge)

The discharge capacity QD1 is measured during the first cycle in the 4.3-3.0 V range at 0.1 C.

Irreversible capacity Qirr is (QC1−QD1)/QC1 (in %).

Rate performance: QD at resp. 0.2, 0.5, 1, 2, 3 C versus QD at 0.1 C.

Fade rate (0.1 C) per 100 cycles, for capacity: (1−QD31/QD7)*100/23.

Fade rate (1.0 C) per 100 cycles, for capacity: (1−QD32/QD8)*100/23.

Energy fade: instead of discharge capacity QD the discharge energy (capacity×average discharge voltage) is used.

Example 2

This example will demonstrate that the cycling stability of island coated LiCoO$_2$ is much higher than that of uncoated LiCoO$_2$, where at the same time its electrical conductivity is about five orders of magnitude lower. The example also provides clear evidence that the cycling stability of the island coated LiCoO$_2$ increases with the decrease of the intrinsic electrical conductivity.

Preparation of LCO-2: 1 mol % magnesium doped Co(OH)$_2$ as precursor for LiCoO$_2$ is prepared in a pilot line. Magnesium doped LiCoO$_2$ (noted LCO-2) is obtained by means of a standard high temperature solid state synthesis by mixing the precursor with Li$_2$CO$_3$ to achieve an average particle size of 25 μm.

Preparation of LCO-3: 1 mol % magnesium doped cobalt tetroxide (Co$_3$O$_4$) powder as precursor for LiCoO$_2$ is used (commercially available product from Umicore, Korea). Magnesium doped LiCoO$_2$ (noted LCO-3) is obtained by means of a standard high temperature solid state synthesis by mixing the precursor with Li$_2$CO$_3$ to achieve an average particle size of 25 μm.

Preparation of island-coated LCO-2 and LCO-3: A cathode powder material is prepared by mixing 95 wt. % of LCO-2 or LCO-3, with 5 wt. % of MOOH mixed transition metal oxy-hydroxide with M=Ni$_{0.55}$Mn$_{0.30}$Co$_{0.15}$ and predetermined amounts of Li$_2$CO$_3$. Examples 2a, 2b and 2c obtained from LCO-2 and Examples 2d, 2e and 2f obtained from LCO-3 are prepared according to the precursor contents listed in Table 1 and sufficiently mixed to prepare a homogeneous raw material mixture.

TABLE 3

Composition of blend for Examples 2a, 2b and 2c obtained from LCO-2 and Examples 2d, 2e and 2f obtained from LCO-3. The Li/M molar ratio relates the Li addition through Li$_2$CO$_3$ (either LCO-2 or LCO-3) to the transition metal content in LiCoO$_2$ and MOOH together (with M = Ni, Mn and Co).

| | LiCoO$_2$ (g) | | MOOH (g) | Li$_2$CO$_3$ (g) | Li/transition metal molar ratio |
|---|---|---|---|---|---|
| Example 2a | 150.00 | LCO-2 | 7.59 | 0 | 0 |
| Example 2b | 150.00 | | 7.59 | 0.57 | 0.0094 |
| Example 2c | 150.00 | | 7.59 | 1.13 | 0.0187 |
| Example 2d | 150.00 | LCO-3 | 7.59 | 0 | 0 |
| Example 2e | 150.00 | | 7.59 | 0.57 | 0.0094 |
| Example 2f | 150.00 | | 7.59 | 1.13 | 0.0187 |

The mixtures are placed in an alumina crucible and heated at 1000° C. for 8 h under constant air flow. After cooling, the resulting powders are sieved and characterized by means of 4-probe DC-conductivity and further fitted in a coin cell for electrochemical characterization. Table 4 summarizes the electrical conductivity under an applied pressure of 63 MPa, and the electrochemical performances of Examples 2a to 2f and of LCO-2 and LCO-3 (test protocol as in Ex. 1). SEM images of LCO-3 and Example 2d are displayed on FIG. 3 (Note that similar results are obtained for the LCO-2 series). The morphology of the two products is very different: LCO-3 has non agglomerated particles with smooth surface whereas Example 2d exhibits a particular island coating at the surface of the $LiCoO_2$ particles.

TABLE 4

Electrical conductivity and electrochemical performances of Examples 2a-f, and of the reference $LiCoO_2$ based compositions.

|  | Discharge capacity 0.1 C (mAh/g) | Discharge capacity 1 C (mAh/g) | Rate performance 3 C (%) | Capacity fading 1 C (%) | Energy fading 1 C (%) | Electrical conductivity (S · cm$^{-1}$) |
|---|---|---|---|---|---|---|
| LCO-2 | 181.1 | 166.2 | 81.39 | 30.9 | 55.3 | 9.27 * 10$^{-3}$ |
| Example 2a | 186.3 | 184.9 | 97.14 | 4.4 | 7.0 | 3.78 * 10$^{-8}$ |
| Example 2b | 187.4 | 185.7 | 97.10 | 4.6 | 5.5 | 9.64 * 10$^{-8}$ |
| Example 2c | 186.9 | 183.2 | 94.80 | 11.4 | 17.5 | 3.15 * 10$^{-6}$ |
| LCO-3 | 175.0 | 153.7 | 75.19 | 77.36 | 104.2 | 4.37 * 10$^{-2}$ |
| Example 2d | 185.2 | 182.8 | 96.02 | 1.9 | 0.5 | 3.19 * 10$^{-8}$ |
| Example 2e | 187.0 | 183.2 | 95.19 | 3.3 | 3.2 | 1.59 * 10$^{-7}$ |
| Example 2f | 186.5 | 181.1 | 93.57 | 8.0 | 8.7 | 3.31 * 10$^{-6}$ |

Figure 4B:
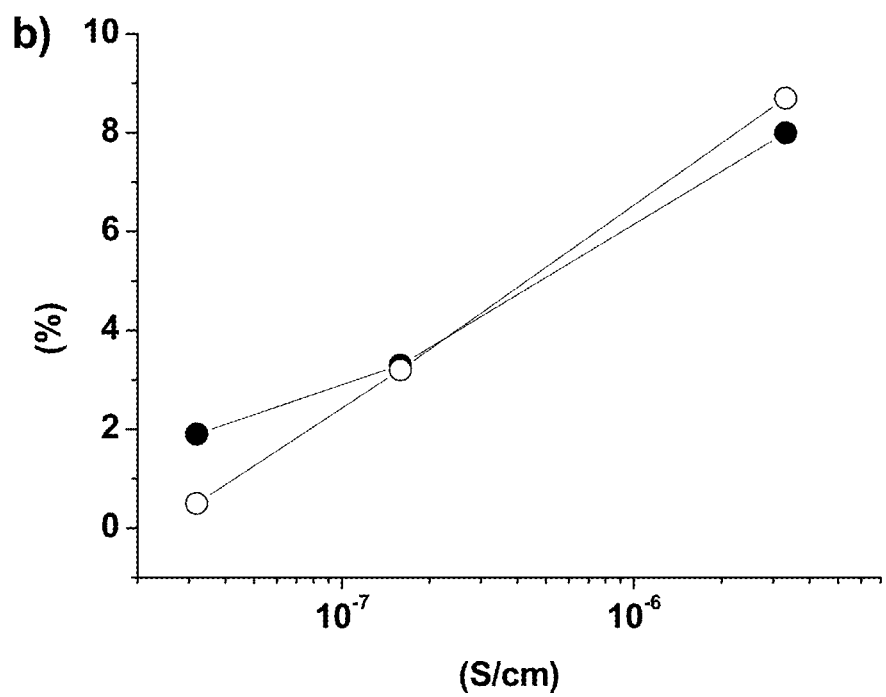

The relationship between electrical conductivity and cycling stability at 4.5V is illustrated on FIG. 4. The electrical conductivity of the island coated samples (i.e. Examples 2a to 2f) is 5 to 6 orders of magnitude lower than for uncoated LCO-2 and LCO-3. Electrochemical properties such as discharge capacity, rate performance, capacity fading and energy fading of LCO-2 and LCO-3 are very poor. Examples 2a to 2f feature dramatic improvements of these properties compared to LCO-2 and LCO-3. For Examples 2a to 2c and 2d to 2f, the electrical conductivity increases upon lithium addition. At the same time, both capacity fading and energy fading are impaired. The decrease of resistivity correlates well with 4.5V stability improvements for both coated and uncoated samples. Examples 2 a-f are insulating and are examples of an embodiment of the invention.

Example 3

This example demonstrates that island coated $LiCoO_2$ having an electronic insulating behavior has superior cycling stability in full cells.

Preparation of Example 3 (Ex3): Ex3 is prepared on a pilot production line by sintering a mixture of LCO-3 and MOOH (M=$Ni_{0.55}Mn_{0.30}Co_{0.15}$) in a 95:5 molar ratio and appropriate lithium carbonate addition to achieve a conductivity of less than 5*10$^{-8}$ S/cm. The average particle size of Ex3 is 25 µm. In this case, the electrical conductivity under an applied pressure of 63 MPa is measured to be 3.94*10$^{-8}$ S/cm. Coin cell performances at 4.5V and 4.6V of Ex3 are listed in Table 5a and show outstanding electrochemical performances.

TABLE 5a

Electrical conductivity and electrochemical performances at 4.5 V and 4.6 V of Example 3.

|  | Discharge capacity 0.1 C (mAh/g) | Discharge capacity 1 C (mAh/g) | Rate performance 3 C (%) | Capacity fading 1 C (%) | Energy fading 1 C (%) | Electr. conductivity (S · cm$^{-1}$) |
|---|---|---|---|---|---|---|
| Example 3 at 4.5 V | 187.3 | 183.4 | 94.91 | 1.47 | 0.87 | 3.94 * 10$^{-8}$ |

TABLE 5a-continued

Electrical conductivity and electrochemical performances at 4.5 V and 4.6 V of Example 3.

| | Discharge capacity 0.1 C (mAh/g) | Discharge capacity 1 C (mAh/g) | Rate performance 3 C (%) | Capacity fading 1 C (%) | Energy fading 1 C (%) | Electr. conductivity (S · cm$^{-1}$) |
|---|---|---|---|---|---|---|
| Example 3 at 4.6 V | 218.3 | 214.6 | | 20.2 | 19.4 | |

The pressed density is measured by applying 1.58 Ton/cm$^2$ on the as-obtained powder. The pressed density of Ex3 is 3.82 g/cm$^3$.

Ex3 is tested in Li-ion polymer battery (LiPB) using a 10 μm polyethylene separator with a graphite-type anode as counter electrode in a lithium hexafluorite (LiPF$_6$) type electrolyte at 25° C. After formation, the LiPB cells are cycled 500 times between 4.35V (or 4.40V) and 3.0 V to measure capacity retentions during extended cycling. A specific capacity C of 800 mAh is assumed for the determination of the charge and discharge rates. Charge is performed in CC/CV mode at 1 C rate using a cutoff current of 40 mA and the discharge was done at 1 C in CC mode down to 3V.

Figure 5A:
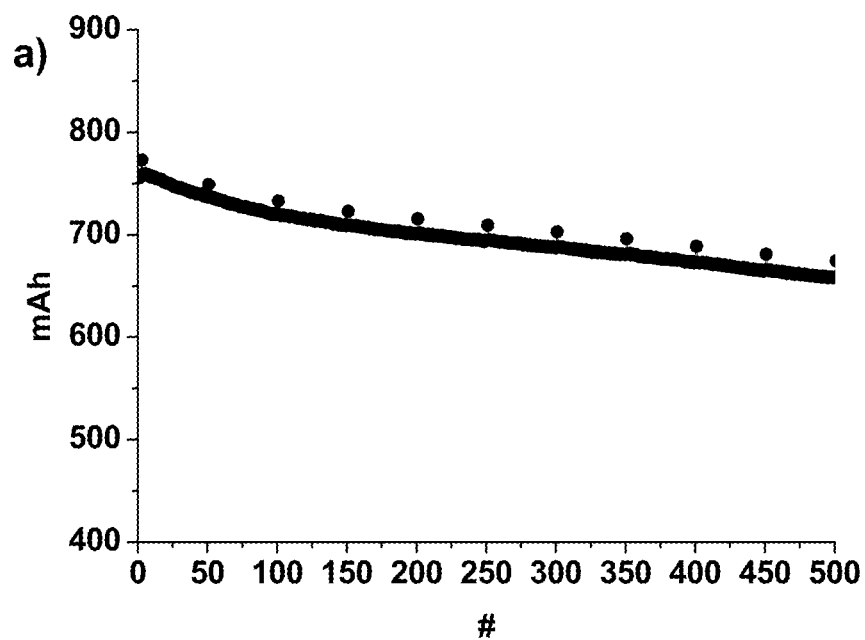
FIG. 5a is a graph illustrating the fading of the discharge capacity upon cycling of Ex3 at 4.35V.
Figure 5B:
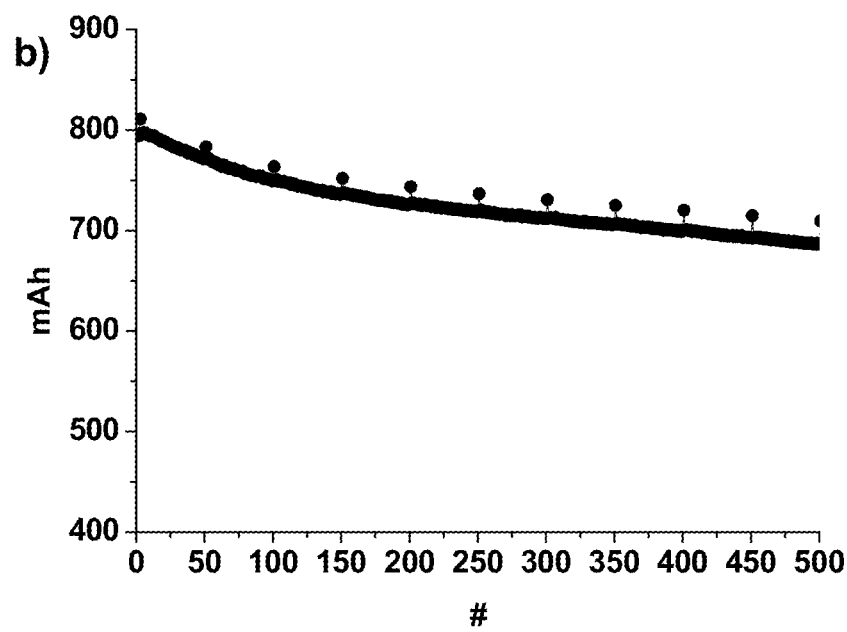
FIG. 5b is a graph illustrating the fading of the discharge capacity upon cycling of Ex3 at 4.4V.
Figure 6:
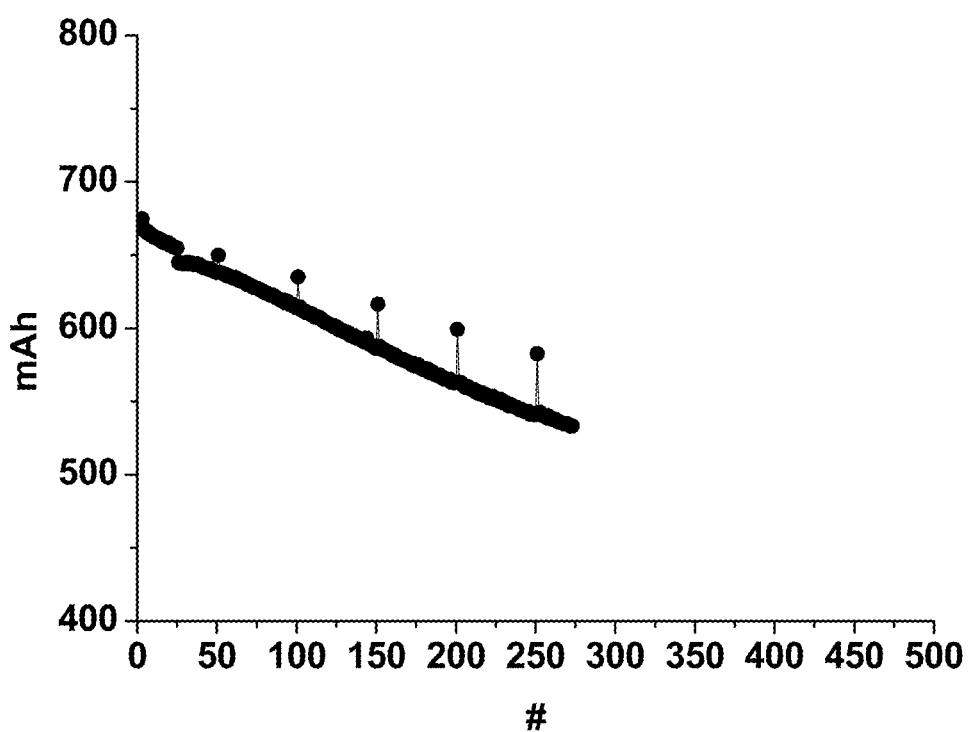
FIG. 6 is a graph comparing the life performance of Ex3 and a standard $LiCoO_2$.

The fading of the discharge capacity upon cycling of Ex3 at high voltage (4.35V) and very high voltage (4.4V) are shown on FIGS. 5a and 5b, respectively. Life performance of Ex3 is compared to a standard LiCoO$_2$ (a Umicore mass production commercial product with an average particle size of 17 μm) for which data are shown on FIG. 6. The electrical conductivity of this standard LiCoO$_2$ is 9.0*10$^{-2}$ S/cm.

Full cell experiments confirm that Ex3, consistent with a lower electrical conductivity, has superior cycle stability compared to standard LiCoO$_2$. At the end of the 500 cycles, Ex3 features a reversibly capacity superior to 85% of the initial capacity both at 4.35V and 4.40V where a drop to 85% is quickly reached after 200 cycles for the standard LiCoO$_2$ at 4.35V.

Example 4A

This example presents lithium metal oxide compounds with different Li:M stoichiometry prepared by the following steps: 5 mol % of hydroxide-based NMC precursor having the metal formula Ni$_{0.55}$Mn$_{0.30}$Co$_{0.15}$ and 1.2 mol % (vs. metal content in NMC precursor and LiCoO$_2$ precursor) of lithium carbonate are mixed with 95 mol % of a 1 mol % Mg doped LiCoO$_2$ (the LiCoO$_2$ precursor) and homogenously blended. The LiCoO$_2$ precursor is a Umicore mass production commercial product having a monolithic morphology with a mean particle size D50 in volume of about 22.7 μm. The mixture is then fired at 1000° C. for 8 hours in an air flow. The sintered product is milled and classified, resulting in a powderous materials with an average volumetric particle size (D50) of around 24.5 μm. The finally obtained powder is labeled Ex4-1. An ICP test on Ex4-1 sample shows a lithium to metal ratio of 0.991 and a general composition of Li$_{0.991}$Co$_{0.947}$Ni$_{0.028}$Mn$_{0.015}$Mg$_{0.010}$O$_{2\pm\delta}$. The electrical conductivity is measured at 1.22×10$^{-7}$S/cm. Another lithium metal oxide compound is manufactured as Ex4-1, except that only 0.2 mol % (vs. metal content in NMC precursor and LiCoO$_2$ precursor) of lithium carbonate is mixed with the LiCoO$_2$ precursor. This powder is labeled Ex4-2. The ICP of Ex4-2 shows a lithium to metal ratio of 0.981 and a general composition of Li$_{0.981}$Co$_{0.946}$Ni$_{0.028}$Mn$_{0.015}$Mg$_{0.010}$O$_{2\pm\delta}$. The electrical conductivity is <10$^{-8}$S/cm.

These two samples are thus differentiated by the Li to metal ratio, which is an essential factor affecting the physical and electrochemical properties of the final lithium metal oxide compounds. The crystallite and electrochemical properties of the samples are compared through a X-ray diffraction test and a coin cell test. In the X-ray diffraction test, the phase composition of each sample can be analyzed and indexed from their XRD pattern. The diffraction patterns are collected with a Rigaku X-Ray Diffractometer (D/MAX-2200/PC). The scan speed is set at continuous scanning at 1 deg per minute. The step-size is 0.02 deg. Scans are performed between 15 and 85 2-theta degree. The XRD patterns are analyzed by Rietveld refinement using semi-automatized TOPAS software. To prevent fluctuations the room temperature is kept all the time near to 24° C.

Figure 7A:
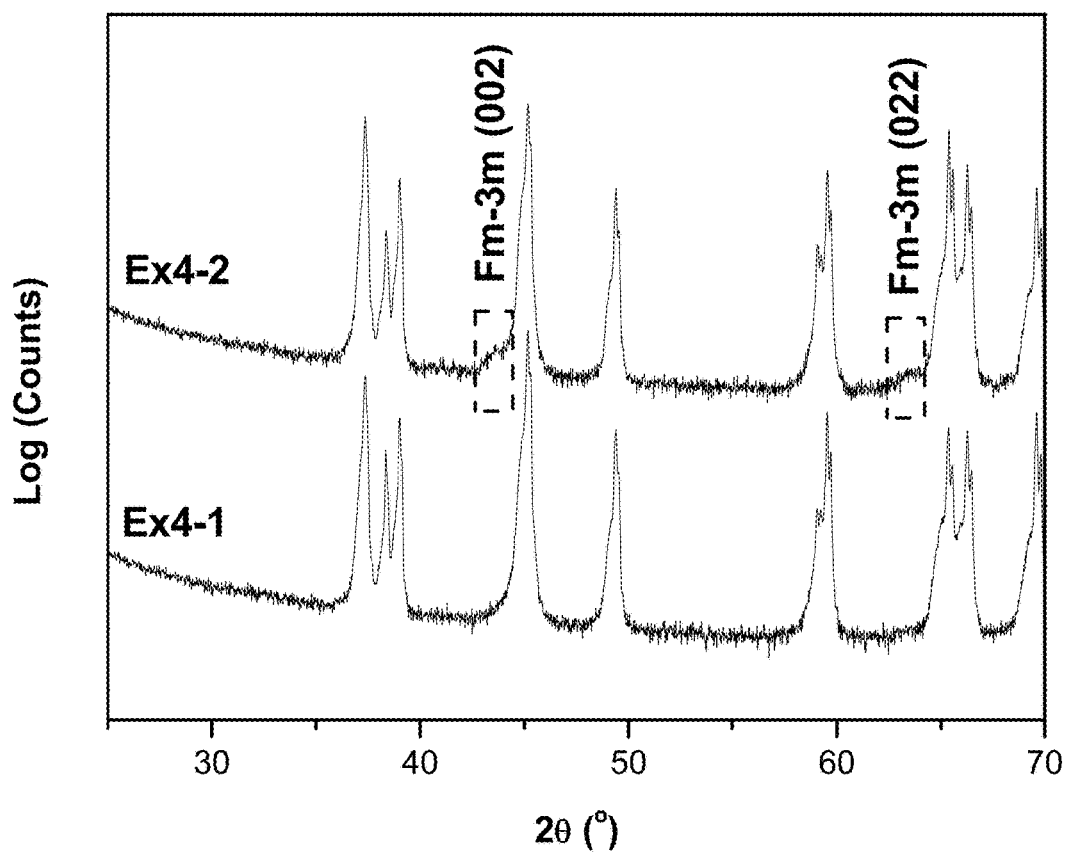
FIG. 7A shows the XRD patterns of Ex4-1 and Ex4-2 in a selected $2\theta$ range of 21-70°.

FIG. 7A shows the XRD patterns of Ex4-1 and Ex4-2 in a 2 θ range of 21-70°, where the peak intensity is represented in the logarithmic scale with base 10. XRD patterns were analyzed by TOPAS to determine phase composition. The XRD patterns of Ex4-1 and Ex4-2 are dominated by the characteristic peaks of O3 type layered phases with space group R-3m. All the peaks have a left shoulder suggesting that Ex4-1 and Ex4-2 are composite materials of a least two O3 phases. For Ex4-1; the first O3 phase has hexagonal lattice parameters a=2.830 Å and c=14.146 Å and amounts to 23.7 wt %; the second O3 phase has hexagonal lattice parameters a=2.817 Å and c=14.055 Å and amounts to 76.3 wt %. For Ex4-2; the first O3 phase has hexagonal lattice parameters a=2.832 Å and c=14.140 Å and amounts to 23.7 wt %; the second O3 phase has hexagonal lattice parameters a=2.817 Å and c=14.051 Å and amounts to 76.3 wt %.

In addition, EX4-2's XRD pattern shows the presence of an extra impurity phase; the content in weight percent of this impurity phase is determined by Rietveld refinement and is shown in Table 6B. The impurity phase is indexed as a crystalline cubic rock-salt structure having space group Fm-3m, whose characteristic Bragg peaks (002) and (022) are located around 42.6° and 61.8°, respectively, as circled by the dash lines in FIG. 7A. The impurity phase has a lattice constant around 4.165 Å. Considering the space group and lattice constant, the impurity phase may have a composition similar to the Li$_x$Ni$_{1-x}$O prototype, where 0<x<1. The XRD pattern of the other sample (Ex4-1) does not show the existence of such an impurity phase.

Coin Cell Test for Examples 4A & B

The final LiCoO$_2$-based powders are electrochemically tested in a small scale in a half cell (=a coin cell). The half-cell is assembled by placing a separator (from SK Innovation) between the positive electrode and a piece of lithium metal as a negative electrode, and dropping the electrolyte of 1M LiPF$_6$ in EC/DMC (1:2) between separator and electrodes. All the cell tests in the present invention follow the procedure as shown in Table 6A.

TABLE 6A coin cell testing procedure for Ex 4A & 4B

| Cycle # | Charge | | | Discharge | | |
|---|---|---|---|---|---|---|
| | C-rate | E-Curr | V | C-rate | E-Curr | V |
| 1 | 0.10 | — | 4.3 | 0.10 | — | 3.0 |
| 2 | 0.25 | 0.05 C | 4.3 | 0.20 | — | 3.0 |
| 3 | 0.25 | 0.05 C | 4.3 | 0.50 | — | 3.0 |
| 4 | 0.25 | 0.05 C | 4.3 | 1.00 | — | 3.0 |
| 5 | 0.25 | 0.05 C | 4.3 | 2.00 | — | 3.0 |
| 6 | 0.25 | 0.05 C | 4.3 | 3.00 | — | 3.0 |
| 7 | 0.25 | 0.1 C | 4.6 | 0.10 | — | 3.0 |
| 8 | 0.25 | 0.1 C | 4.6 | 1.00 | — | 3.0 |
| 9-33 | 0.25 | — | 4.6 | 0.50 | — | 3.0 |
| 34 | 0.25 | 0.1 C | 4.6 | 0.10 | — | 3.0 |
| 35 | 0.25 | 0.1 C | 4.6 | 1.00 | — | 3.0 |

1 C-rate can be defined as 160 mAh/g. For example, 0.1 C means that the cell will be charged or discharged in 10 hour. "E-Curr" and "V" stands for the end current and cut-off voltage, respectively. At the first cycle, the DQ0.1 C (discharge capacity of the first cycle) and IRRQ (irreversible capacity) can be determined. The rate performance can be calculated from the subsequent five cycles. The performance of cycle stability is obtained from cycle #7 to #35.

Capacity fading at 0.1 C and 1 C are calculated as follows and are expressed in % per 100 cycles:

$$0.1C\ QFad. = \left\{1 - \frac{DQ34}{DQ7}\right\} \times \frac{10000}{27} \text{in \%/100 cycles}$$

$$1C\ QFad. = \left\{1 - \frac{DQ35}{DQ8}\right\} \times \frac{10000}{27} \text{in \%/100 cycles}$$

Energy fading at 0.1 C and 1 C are calculated as follows and are expressed in % per 100 cycles. Vn is the average voltage at cycle n.

$$0.1C\ EFad. = \left\{1 - \frac{DQ34 \times \overline{V34}}{DQ7 \times \overline{V7}}\right\} \times \frac{1000}{27} \text{in \%/100 cycles}$$

$$1C\ EFad. = \left\{1 - \frac{DQ35 \times \overline{V35}}{DQ8 \times \overline{V8}}\right\} \times \frac{1000}{27} \text{in \%/100 cycles}$$

Retained discharge capacity at 0.1 C and 1 C refer to the DQ34 and DQ35 respectively.

Table 6B lists the cyclability of coin cells containing Ex4-1 and Ex4-2 as cathode active materials. The cyclability is evaluated by looking at the capacity fading at 0.1 C per 100 cycles, the capacity fading at 1 C per 100 cycles, the energy fading at 0.1 C per 100 cycles and the energy fading at 1 C per 100 cycles—Table 6A and the discussion about the coin cell tests above. When comparing these parameters, the capacity fading and energy fading of Ex4-2 are smaller than those of Ex4-1, so that sample Ex4-2 has a better cyclability, which may result from the existence of the impurity phase with cubic crystalline structure. Our observation on the relationship between cubic impurity phase with space group Fm-3M and cycling stability is quite novel and differs from the common understanding that the presence of cubic impurities generates a negative effect on cyclability of lithium transition metal oxides. Accordingly, in this example, it is demonstrated that the presence of an impurity phase with space group Fm-3m can improve cyclabilty of Mg doped $LiCoO_3$.based cathode material, whose surface is coated or doped with Ni and Mn.

TABLE 6B coin cell results of sample Ex 4-1 and Ex 4-2

| | Phase composition (wt %) | | Q fading (%/100) | | E fading (%/100) | |
|---|---|---|---|---|---|---|
| Sample ID | Fm-3m | R-3m | 0.1 C | 1 C | 0.1 C | 1 C |
| Ex 4-1 | — | 100 | 35.72 | 42.67 | 35.63 | 43.72 |
| Ex 4-2 | 2.43 | 97.57 | 4.21 | 6.88 | 2.76 | 4.03 |

Table 6C shows more samples prepared following the method described in "Example 4A", but different amounts of NMC precursor and lithium carbonate were added, as well as different compositions of the NMC precursors. All the powders have a mean particle size of around 20 μm. Compared with sample Ex4-1, which shows no impurity phase, all samples listed in Table 6B present a smaller capacity and energy fading, which results in an improved cycling stability.

TABLE 6C

Description and Coin cell results of sample Ex4-3 to Ex4-6

| Sample ID | Lithium carbonate Mol % | NMC precursor | | E fading (%/100) 1 C | a (Å) of Fm-3m phase |
|---|---|---|---|---|---|
| | | Mol % | Ni:Mn:Co (mol %) | | |
| Ex4-3 | 1 | 5 | 55:30:15 | 18.52 | 4.153 |
| Ex4-4 | 0 | 5 | 38:29:33 | 19.55 | 4.146 |
| Ex4-5 | 0 | 20 | 38:29:33 | 30.58 | 4.152 |
| Ex4-6 | 0 | 15 | 38:29:33 | 34.61 | 4.138 |

Example 4B

This example presents four lithium metal oxide compounds with different Li:M stoichiometry prepared by the following steps: 0.75 mol % of hydroxide-based NMC precursor with metal composition $Ni_{0.55}Mn_{0.30}Co_{0.15}$ (the NMC precursor) is mixed with a $LiCoO_2$ precursor and homogenously blended. The $LiCoO_2$ precursor is a Umicore mass production commercial product having a monolithic morphology with a mean particle size of about 5.7 μm and a blend lithium to cobalt molar ratio of about 1.02. The mixture is then fired at 1000° C. for 8 hours in an air flow. The sintered product is milled and classified resulting in a powderous material with an average particle size D50 of around 5 to 8 μm. The final obtained powder has a lithium to metal ratio of 1.012 and is labeled Ex4-7. The ICP composition is $Li_{1.012}Co_{0.994}Ni_{0.004}Mn_{0.002}O_{2\pm\delta}$. Another three lithium metal oxide compounds with different Li to metal stoichiometry are manufactured through the above procedure. One compound is prepared by adding 1.5 mol % of NMC precursor and is labeled Ex4-8, which has a lithium to metal ratio of 1.005 and an ICP composition of $Li_{1.005}CO_{0.987}Ni_{0.008}Mn_{0.005}O_{2\pm\delta}$. Another one is prepared by adding 2 mol % of NMC precursor, having a lithium to metal ratio of 1.000 with an ICP composition of $Li_{1.000}Co_{0.983}Ni_{0.011}Mn_{0.006}O_{2\pm\delta}$ and is labeled Ex4-9. The third one is prepared by adding 3 mol % of NMC precursor and is labeled Ex4-10, which has a lithium to metal ratio of 0.989 with an ICP composition of $Li_{0.989}CO_{0.975}Ni_{0.017}Mn_{0.009}O_{2\pm\delta}$.

Figure 7B:
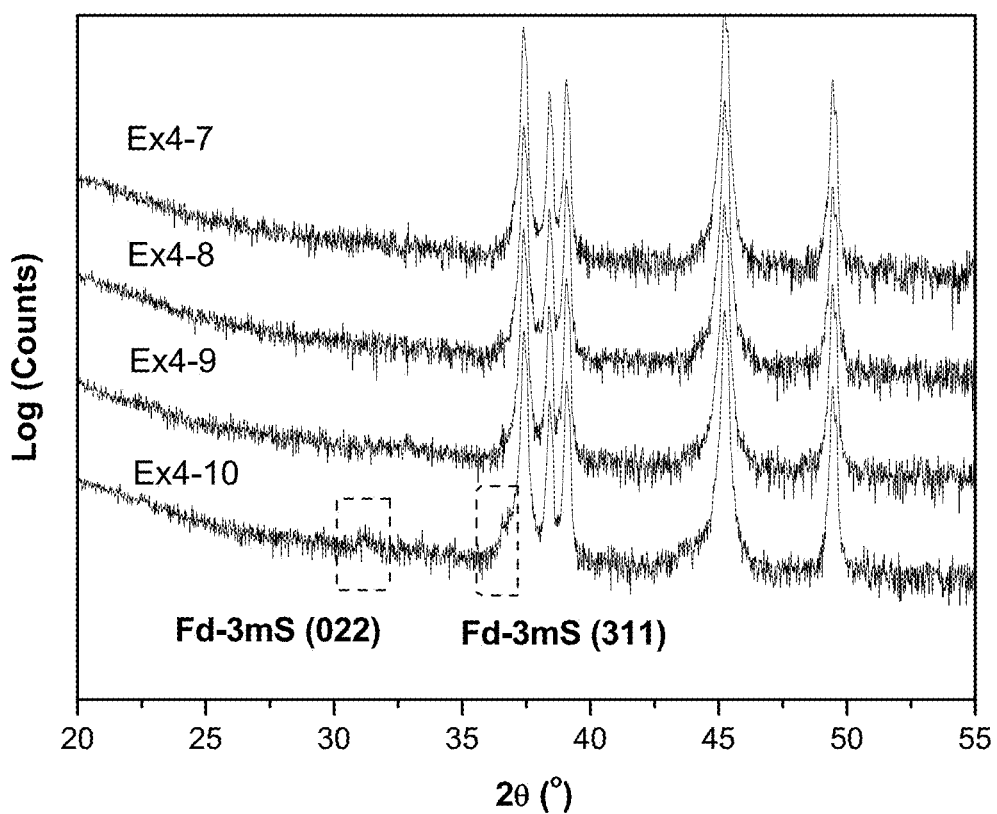
FIG. 7B shows the XRD patterns of Ex4-7 to Ex4-10 in a selected $2\theta$ range of 20-55°.

From sample Ex4-7 to Ex4-10, the Li to metal ratio gradually decreases. The sub-stoichiometric composition of Ex4-10 is characterized by the presence of an impurity phase. FIG. 7B shows the XRD patterns of Ex4-7 to Ex4-10 in a selected 2θ range of 20-55°, where the peak intensity is represented in the logarithmic scale with base 10. All XRD patterns are dominated by characteristic reflections of O3 layered phases. The phase compositions of sample Ex4-7 to Ex4-10 are analyzed as in Example 4A. The results are listed in Table 6D. This phase analysis finds impurity phases in sample Ex4-10, as shown in FIG. 7B, where the two circled Bragg peaks belong to an impurity phase with space group Fd-3mS, which is commonly called (cubic) spinel phase. One peak is located at around 36.7°, corresponding to the Miller index (311) of the Fd-3mS crystalline structure, the other one is at around 31.2° corresponding to the Miller index (022). This spinel phase may contain Ni, Co, Mn and Al and have a general formula $M_3O_4$ (M represents metal). The phase composition and lattice constants of the impurity phases are listed in Table 6D. Ex4-10 has about 0.61 wt % spinel phase.

The cyclability of samples Ex4-7 to Ex4-10 in the coin cell test is summarized in Table 6D. The results demonstrate that sample Ex4-10 possesses the best cyclability among those samples. The cycling performance is highly related to the phase composition of the samples. Ex4-10 samples, having an improved cycling performance, contain the spinel-phase crystalline impurity structure with space group Fd-3mS.

TABLE 6D

XRD phase analysis results and coin cell results of sample Ex 4-7 to 4-10

| Sample ID | a (Å) of Fd-3mS phase | Phase composition (wt %) | | Q fading (%/100) | | E fading (%/100) | |
|---|---|---|---|---|---|---|---|
| | | Fd-3mS | R-3m | 0.1 C | 1 C | 0.1 C | 1 C |
| Ex 4-7 | — | — | 100 | 30.92 | 52.77 | 34.49 | 59.05 |
| Ex 4-8 | — | — | 100 | 14.31 | 23.2 | 14.63 | 24.4 |
| Ex 4-9 | — | — | 100 | 12.03 | 17.95 | 12.45 | 19.37 |
| Ex 4-10 | 8.104 | 0.61 | 99.39 | 9.71 | 13.55 | 10.16 | 14.62 |

Discussion of Examples 4A and 4B

These examples provide cathode materials which have superior cycle stability when charged up to 4.6V in coin cells at room temperature. These materials are $LiCoO_2$-based powders, having the general formula $Li_x(Co_aM_bA_c)_{2-x}O_2$, with x≤0.995, b>=0, c>0, $M=(Mn_mNi_n)$, with m+n=1, A=either one or more of Mg, Ti, Al, Zr. These powderous materials consist of a core and a surface layer, wherein the core is pristine or doped lithium cobaltite, wherein the surface layer comprises lithium metal oxide compound with rhombohedral symmetry (space group R-3m) and one or two metal oxides having a crystal structure of either one of a Fm-3m and a Fd-3mS space group.

The presence of secondary cubic phases with space group Fm-3m and spinel phases with space group Fd-3mS dispersed on the surface of a (doped) R-3m phase lithium cobaltite core is strongly influencing the electrochemical performance of the powder when applied as a cathode material in a coin cell that is cycling under high voltage, especially affecting the cycling stability. Contrary to the understanding in the prior art, this invention discloses that impurity phases with space group Fd-3mS or Fm-3m facilitate the improvement of cycling stability. The superficial impurity phases with space group Fd-3mS or Fm-3m are characterized by their lattice constants: the Fd-3mS phase can be defined by their lattice constant in a range of 8.055 to 8.150 Å, while the Fm-3m phases have a lattice constant in a range of 4.05 to 4.30 Å, or more specifically 4.13 to 4.20 Å.

The composition of the superficial impurity phases according to this invention varies with the elemental composition of the (doped) $LiCoO_2$-based powder. For a spinel phase with space group Fd-3mS, it may have the formula $M'_3O_4$, where M' could be one or more metals included during preparation. For a cubic phase with space group Fm-3m: the lattice constant of the Fm-3m phase in the range of 4.13 to 4.20 Å suggests a possible composition of $Li_{1-x}Ni_xO$ since its typical lattice constant is quite close to this value. The amount of secondary phases in the surface of the powders affects the electrochemical performance of the powders, especially their cyclability. Coin cell results show that samples with a relatively high amount of secondary phase have an improved cycle stability. However, the amount of secondary phases has to be optimized. Typically, large amount of secondary phases in lithium metal oxides affect the capacity performance, since these impurity phases are non-electroactive. It is believed that the amount of secondary phases should be smaller than 5 wt %.

A careful control of the lithium to metal ratio is advised to obtain (doped) $LiCoO_2$-based powders according to this invention. It is observed that phases with space group Fd-3mS or Fm-3m appear in Li-deficient powders, which means the lithium to metal ratio is smaller than unit. Contrary to the prior art however, the secondary phases are superficial where the core of the material is phase pure (R-3m). $LiCoO_2$ core powders that are surface-treated with NMC-precursors carry cubic or spinel phases in the case of Li-deficiency. Thus, according to this invention, the cycling stability of $LiCoO_2$-based powders at high voltage can be improved when the ratio of Li to metal (metal=Co+M+A) is between 0.95 and less than 1, preferably between 0.95 and 0.99. When the molar ratio is 1 or greater than 1, electrochemical properties, mainly cycle stability at high voltage deteriorates. On the other hand, when the ratio is below 0.95, the specific capacity significantly decreases.

Example 5

This example demonstrates that island coated $LiCoO_2$ have an electronic insulating shell, providing superior cycling stability, and an electronic conductive core.

Example 5a sample is prepared on a pilot line by sintering a mass production 1 mol % magnesium-doped $LiCoO_2$ with a mean particle size of 23 μm (notation: LCO-5) and MOOH ($M=Ni_{0.55}Mn_{0.30}Co_{0.15}$) in a 95:5 molar ratio and appropriate lithium carbonate addition to achieve conductivity lower than $1*10^{-7}$ S/cm. The pressed density of Ex 5a is 3.87 g/cm³.

Preparation of Counter Example 5b: 30 g of Example 5a and 400 g of 1 cm diameter zirconia balls are put in a 1 L jar and shaken by means of a Turbula mixer for 12 h. The as prepared powder is then collected for further experiments.

TABLE 7

Electrical conductivity and electrochemical
performances of LCO-5 and Ex. 5a and 5b.

| | Discharge capacity 0.1 C (mAh/g) | Discharge capacity 1 C (mAh/g) | Rate performance 3 C (%) | Capacity fading 1 C (%) | Energy fading 1 C (%) | Electrical conductivity (S · cm$^{-1}$) |
|---|---|---|---|---|---|---|
| LCO-5 | 176.28 | 158.5 | 81.02 | 72.03 | 99.33 | 4.80 * 10$^{-2}$ |
| Ex 5a | 186.3 | 183.0 | 95.19 | 4.2 | 4.2 | 7.13 * 10$^{-8}$ |
| Counter Ex 5b | 166.2 | 159.6 | 89.04 | 53.59 | 78.87 | 8.41 * 10$^{-3}$ |

SEM images of LCO-5 and Example 5a and CEx 5b are displayed on FIG. 8 (each time two different magnifications). The morphologies of the products are very different. LCO-5 has non agglomerated particles with a smooth surface, whereas Ex. 5a exhibits a particular island coating at the surface of the LiCoO$_2$ particles. The SEM image of Counter Ex 5b clearly illustrates that ball rolling treatment breaks up the island-coated particles. The particle size distributions measured by laser diffraction in dry medium of Ex 5a and 5b are illustrated on FIG. 9. The particle size distribution of the ball milled sample shows a dramatic decrease of the mean particle size, from 23 μm to 10 μm, and clearly confirms the increase of fine particle fraction. The ball milled process indisputably breaks particles resulting in a substantial exposure of the core material. This core material has an electrical conductivity comparable to the untreated LCO-5. Hence it is shown that the core of Ex. 5a has a conductivity >1*10$^{-3}$ S/cm, whilst the shell has a conductivity lower than 1*10$^{-7}$ S/cm. The PSD also shows a small amount of large particles originating from loose agglomerates of the relatively sticky powder.

The electrical conductivity of Ex 5a under an applied pressure of 63 MPa at 25° C. is measured to be 7.13*10$^{-8}$ S/cm, which is 6 orders of magnitude lower than the uncoated LCO-5. Ball milled CounterEx 5b features an increase of 5 orders of magnitude of the conductivity compared to 5a. This result brings evidence supporting the higher electrical conductivity of the core compared to the shell.

Coin cells testing performances and electrical conductivity of Ex 5a and CEx5b and LCO-5 are listed in Table 7. As previously shown in Examples 1 and 2, the capacity and energy fading of Ex 5a (between 3.0 and 4.5 V) are noticeably improved compared to uncoated LCO-5 where at the same time the electrical conductivity is decreased. The electrochemical performances of CounterEx 5b sample are substantially impaired, which we believe is caused by the disappearance of the electron insulating shell structure.

Counter Example 6

This example illustrates that prior art transition-metal-based oxide cathode materials cannot achieve a low electrical conductivity and good high voltage stability at the same time. The electrical conductivity and electrochemical performances of several commercially available products (from Umicore, Korea) are summarized in Table 8. These materials have a general composition Li$_{1+x}$M$_{1-x}$O$_2$ with x≅0.05 with M=Ni$_{0.5}$Mn$_{0.3}$Co$_{0.2}$ for CounterEx 6a, M=Ni$_{1/3}$Mn$_{1/3}$Co$_{1/3}$ for CounterEx 6b, and M=Ni$_{0.8}$Co$_{0.15}$Al$_{0.05}$ for CounterEx 6c. It is generally accepted that the electrical conductivity of LiCoO$_2$ is highly sensitive to its lithium stoichiometry and increases with lithium excess. In Levasseur, Thesis #2457, Bordeaux 1 University, 2001, it is reported that there is a difference of two orders of magnitude in the electrical conductivity at room temperature between the lithium over-stoichiometric and stoichiometric LiCoO$_2$. M. Ménétrier, D. Carlier, M. Blangero, and C. Delmas, in Electrochemical and Solid-State Letters, 11 (11) A179-A182 (2008), reported a preparation method to elaborate highly stoichiometric LiCoO$_2$. The preparation of this highly stoichiometric LiCoO$_2$ sample is repeated and is being used to prepare CounterEx 6d.

TABLE 8

Electrical conductivity and electrochemical
performances of CounterEx 6a-d.

| | Transition metal composition | Capacity fading 1 C (%) | Energy fading 1 C (%) | Electrical conductivity (S · cm$^{-1}$) | Pressed density (g/cm$^3$) |
|---|---|---|---|---|---|
| CounterEx 6a | Ni$_{0.5}$Mn$_{0.3}$Co$_{0.2}$ | 9.49 | 14.35 | 2.21 * 10$^{-3}$ | 3.25 |
| CounterEx 6b | Ni$_{1/3}$Mn$_{1/3}$Co$_{1/3}$ | 8.63 | 11.44 | 2.03 * 10$^{-4}$ | 3.22 |
| CounterEx 6c | Ni$_{0.8}$Co$_{0.15}$Al$_{0.05}$ | 14.25 | 14.95 | 3.47 * 10$^{-2}$ | 3.25 |
| CounterEx 6d | Co | 48.46 | 79.44 | 1.39 * 10$^{-4}$ | 3.40 |

Additionally the pressed density was measured because a high pressed density is important for the application of cathodes in high end batteries. The pressed density of CounterEx 6a-6d is at least 0.4 g/cm' lower than the example embodiments of the present invention, making these materials unsuitable for high end batteries. The practically achievable volumetric energy density (meaning capacity achieved in the fixed volume of a fixed cell design) still remains slightly lower. In addition, these cathode materials feature electrical conductivities above 10$^{-5}$ S/cm. This is at least 2-3 orders larger than the electrical conductivity of the example cathode materials of some embodiments of the present invention.

Example 7

This example demonstrates that island coated magnesium and aluminum doped LiCoO$_2$—having an electronic insulating behavior—has superior cycling stability in coin cells.

Preparation of Example 7 (Ex7)

1 mol % magnesium and 1 mol % aluminum doped cobalt tetroxide (Co$_3$O$_4$) powder as precursor for LiCoO$_2$ is used (commercially available product from Umicore, Korea). Magnesium and aluminum doped LiCoO$_2$ (noted LCO-6) is obtained by means of a standard high temperature solid state synthesis by mixing the precursor with $Li_2CO_3$ to achieve an average particle size of 20 Ex7 is prepared on a pilot production line by sintering LCO-6 and MOOH (M=$Ni_{0.55}Mn_{0.30}Co_{0.15}$) in a 95:5 molar ratio and appropriate lithium carbonate addition to achieve a conductivity of less than $5*10^{-8}$ S/cm. The average particle size of Ex7 is 20 In this case, the electrical conductivity under an applied pressure of 63 MPa is measured to be $4.40*10^{-8}$ S/cm. Coin cell performances of Ex7 are listed in Table 9 and show outstanding electrochemical performances.

TABLE 9

Electrical conductivity and electrochemical performances of Examples 9.

| | Discharge capacity 0.1 C (mAh/g) | Discharge capacity 1 C (mAh/g) | Rate performance 3 C (%) | Capacity fading 1 C (%) | Energy fading 1 C (%) | Elec. conductivity (S · cm$^{-1}$) |
|---|---|---|---|---|---|---|
| Example 9 at 4.5 V | 184.2 | 178.4 | 89.93 | 4.5 | 2.9 | $4.40 * 10^{-8}$ |
| Example 9 at 4.6 V | 215.9 | 210.2 | | 26.0 | 24.0 | $4.40 * 10^{-8}$ |

The pressed density is measured by applying 1.58 Ton/$cm^2$ on the as-obtained powder. The pressed density is high, 3.82 g/$cm^3$, this high value together with the good electrochemical performance, makes these cathodes good candidates for high end battery applications.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

Example 8

This example will demonstrate that cubic impurities are preferentially localized on the surface of LCO particles and that the Ni:Mn and (Ni+Mn):Co molar ratios are strongly influenced by the Li:M stoichiometry.

Example 8 (Ex8) is prepared as follows: First a Mg, Al and Ni doped $Co_3O_4$ precursor is mixed with 0.5 mol % MgO, 0.25 mol % $Al_2O_3$ and 1 mol % NiO powders, and the mixture is fired at 950° C. for 8 h. The Mg, Al and Ni-doped $Co_3O_4$ is then blended with $Li_2CO_3$ in a Li:(Co+Mg+Al+Ni) molar blend ratio of 1.06. 1.6 Kg of the mixture is put in a mullite sagger and fired at 995° C. for 12 h in an air flow of 4 $m^3$/kg. The sintered product is milled and classified. The average particle size in volume D50 is 27.1 μm, and the sintered product is called LCO-8. It will serve as core material in the further experiment.

Next, 1 mol % of Mn-nitrate aqueous solution is dispersed and applied onto the surface of a mixture of 95.03 wt % of LCO-8 and 4.97 wt % of Mg, Al and Ni doped $Co_3O_4$ precursor. The mixture is then dried overnight at 200° C. The targeted nominal Li:(Co+Mg+Al+Ni+Mn) molar ratio of the mixture is 0.99 and the targeted nominal Ni:Mn molar ratio is 1.

Ex8-1 is prepared by firing 100 g of the above dried Mn-nitrate, LCO-8 and Mg, Al and Ni doped $Co_3O_4$ precursor mixture at 1000° C. for 10 h in air. The sintered product is milled and classified. The targeted Li:M ratio of EX8-1 is 0.99. The conductivity is measured to be $<10^{-8}$S/cm.

Ex8-2 is prepared in a similar way as Ex8-1 except that 3 mol % (vs. metal content in LCO-8 and Mg, Al and Ni doped $Co_3O_4$ precursor) $Li_2CO_3$ is homogeneously added to the mixture. The targeted Li:M ratio of EX8-2 is 1.02. The conductivity is measured to be $<10^{-8}$S/cm.

Figure 10:
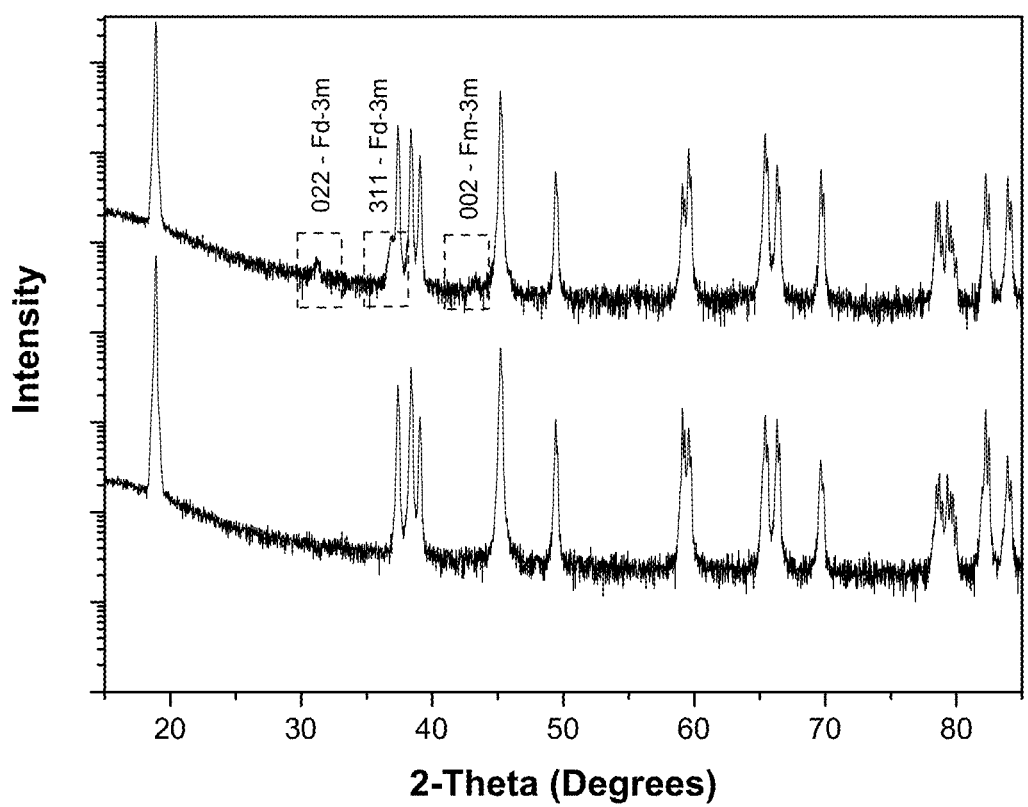
FIG. 10 shows the XRD patterns of Ex8-1 and Ex8-2.

The XRD patterns of Ex8-1 and Ex8-2 are shown in FIG. 10. Both XRD patterns are dominated by the characteristic reflections of O3 layered phases with space group R-3m. EX8-1 shows extra reflections that are well indexed using an extra cubic-spinel impurity phase with space group Fd-3m and a=8.092 Å with 1.93 wt % content and an extra rock salt cubic phase with space group Fm-3m and a=4.182 Å with 0.34 wt % as determined by Rietveld refinement.

Figure 11A:
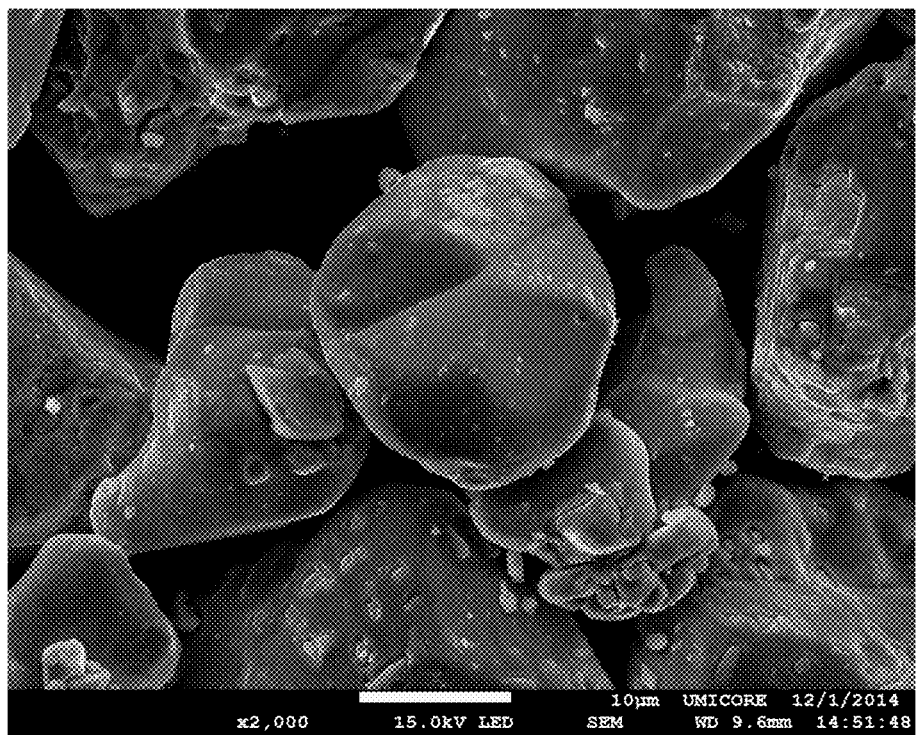
FIGS. 11A and 11B are FESEM images of Ex8-1 and Ex8-2, respectively.
Figure 11B:
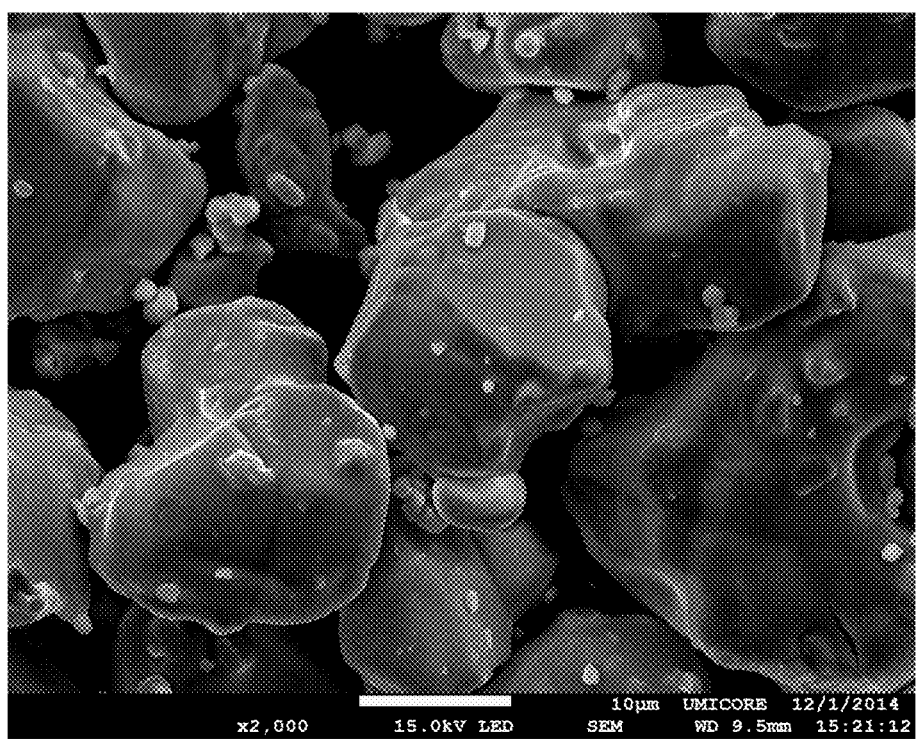

FESEM images of Ex8-1 and Ex8-2 are shown on FIGS. 11a and 11b, respectively. The surface of Ex8-2 particles appears to be smoother than Ex8-1. Ex8-1 particle surfaces show inclusion domains and surface structures of typical size <1 μm. The authors believe that these inclusion domains, only observed for the Li-deficient EX8-1 sample, are the signature of surface localized cubic impurity domains.

Figure 12A:
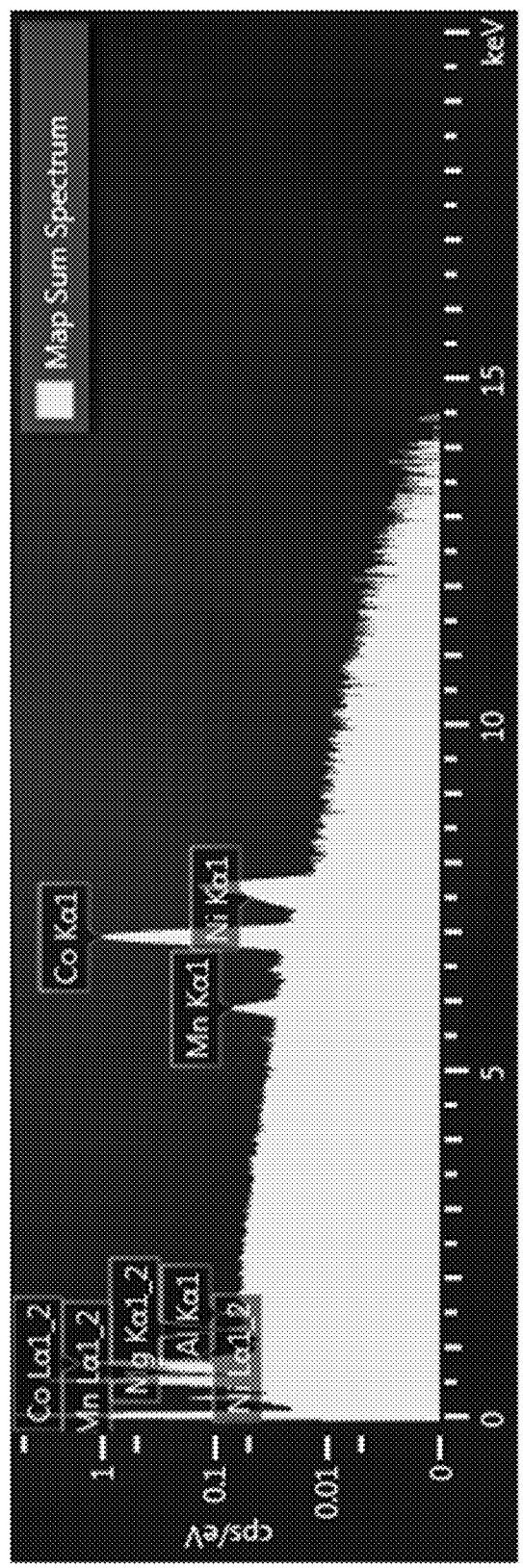
FIGS. 12A and 12B are EDS spectra of Ex8-1 and Ex8-2, respectively.
Figure 12B:
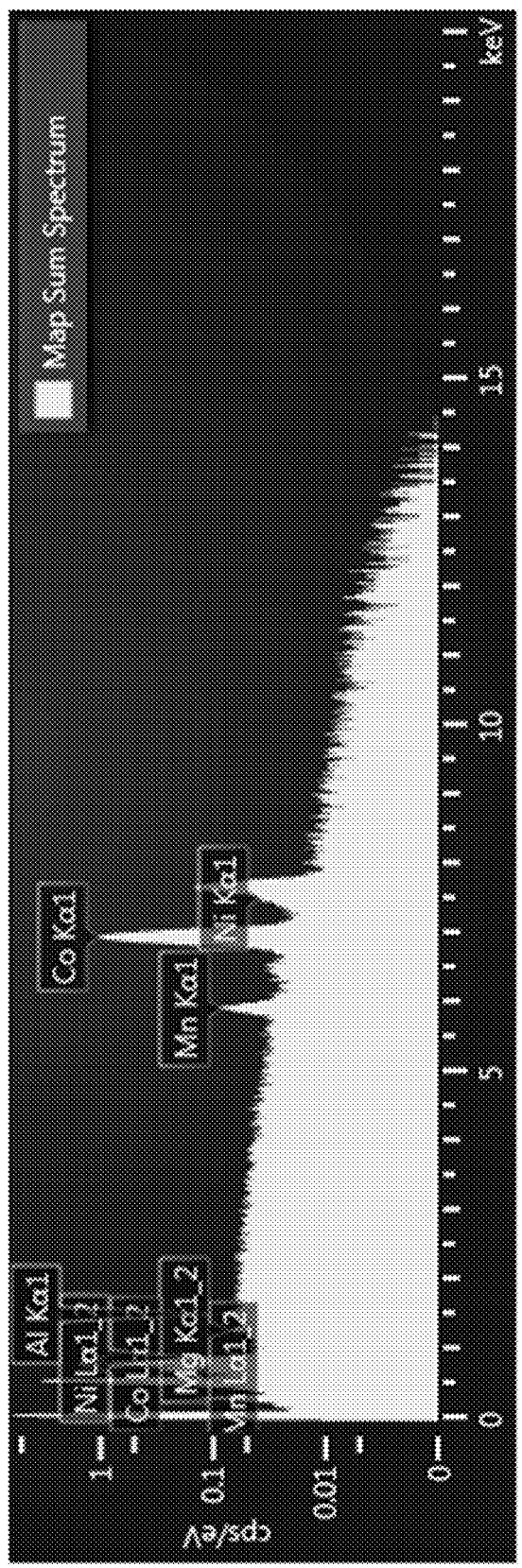

Next, Ex8-1 and Ex8-2 are investigated by means of surface EDS in order to determine their respective surface atomic compositions. EDS spectra of Ex8-1 and Ex8-2 are shown on FIGS. 12a and 12b, respectively. Ex8-1's particle surface metal composition, as determined by EDS is $Co_{0.9322}Ni_{0.0221}Mn_{0.0211}Mg_{0.0135}Al_{0.111}$. The surface Ni:Mn molar ratio is 1.05 and the surface (Ni+Mn+Mg+Al):Co molar ratio is 0.073. The latter ratio significantly exceeds the expected (Ni+Mn+Mg+Al):Co nominal mixture ratio expected to be ~0.031, suggesting that the surface is enriched in Ni, Mn, Mg, Al. Ex8-2's particle surface metal composition, as determined by EDS is $Co_{0.9410}Ni_{0.0135}Mn_{0.0272}Mg_{0.0095}Al_{0.088}$. The surface Ni:Mn molar ratio is 0.5 and the surface (Ni+Mn+Mg+Al):Co molar ratio is 0.063. The latter ratio significantly exceeds the expected (Ni+Mn+Mg+Al):Co nominal mixture ratio expected to be ~0.031, suggesting that the surface is enriched in Ni, Mn, Mg, Al. The surface Ni:Mn molar ratio (0.5) is however significantly lower than the expected Ni:Mn nominal mixture ratio of 1.0. The surface of Ex8-1 sample is significantly more enriched in Ni and Mg compared to Ex8-2. The mechanism is believed to be linked to the Li:M ratio where at lower Li:M, Ni and Mg preferentially accumulate at the surface of the particles and stabilize a cubic impurity.

The following general mechanism can be suggested as a tentative explanation of the current invention:
  Sample EX8-1 comprises both spinel and cubic impurities,
  Cubic rock-salt and spinel impurities are preferentially localized on the surface of the particles, Cubic rock-salt and spinel impurities comprise the elements Li, Co, Mn, Ni, Al and Mg and are believed to be enriched in Mn, Ni, Al and Mg.

It is worth mentioning that the size and spatial distribution of the cubic (rock-salt or spinel) impurity is believed to be strongly affected by the Li:M and M composition. In the present work, investigation of such impurities has been done by XRD but other techniques such as transmission-electron microscopy (TEM), high-resolution TEM (HR-TEM), high-resolution scanning TEM (HR-STEM), High-Angle Annular Dark-Field Scanning Transmission Electron Microscopy (HAADF-STEM) and/or electron energy loss spectroscopies (EELS) are also suitable.

The invention claimed is:

1. A lithium metal oxide powder for use as a cathode material in a rechargeable battery, consisting of a core and a surface layer, the lithium metal oxide having the general formula $Li_x(Co_aM_bA_c)_{2-x}O_{2\pm\delta}$, with $x \leq 0.995$, $b>0$, $c \geq 0$, $a+b+c=1$, $|\delta| \leq 0.1$, $M=(Mn_mNi_n)$ with $m+n=1$, A is a dopant, wherein the core and surface layer are either:
 a pristine Li cobaltite core and a surface layer comprising a lithium metal oxide compound wherein at least 98 mol % of the metal consists of the elements Li, Mn, Ni and Co; or
 a doped Li cobaltite core, wherein the dopant A is either one or more of Mg, Ti, Al and Zr, and a surface layer comprising a lithium metal oxide compound wherein at least 98 mol % of the metal consists of the elements Li, Mn, Ni, Co and dopant A, and
wherein in both alternatives the surface layer comprises:
 a phase with rhombohedral symmetry with space group R-3m, and
 either one or both of a cubic phase oxide having a crystal structure with a Fm-3m space group, and a cubic phase oxide having a crystal structure with a Fd-3mS space group, and
wherein the surface layer comprises Mn and Ni enriched islands, the islands having a Mn and Ni concentration that is higher than in the bulk of the particles.

2. The lithium metal oxide powder of claim 1, wherein $x \geq 0.970$.

3. The lithium metal oxide powder of claim 1, wherein $0.974 \leq x \leq 0.993$.

4. The lithium metal oxide powder of claim 1, wherein $0 < c \leq 0.03$, and A is either one or more dopants selected from the group consisting of Mg, Ti, Al and Zr.

5. The lithium metal oxide powder of claim 1, wherein the cubic phase oxide having a crystal structure with a Fm-3m space group has a lattice constant "a" with $4.05 \leq a \leq 4.30$, and the cubic phase oxide having a crystal structure with a Fd-3mS space group has a lattice constant "a" with $8.055 \leq a \leq 8.150$, "a" being expressed in Å.

6. The lithium metal oxide powder of claim 1, wherein the cubic phase oxide having a crystal structure with a Fm-3m space group has a lattice constant "a" with $4.13 \leq a \leq 4.20$, and the cubic phase oxide having a crystal structure with a Fd-3mS space group has a lattice constant "a" with $8.055 \leq a \leq 8.110$, "a" being expressed in Å.

7. The lithium metal oxide powder of claim 1, wherein the amount of cubic phase oxide in the powder is between 0.1 and 3 wt %.

8. The lithium metal oxide powder of claim 1, wherein the powder has an electrical conductivity of less than $10^{-5}$ S/cm when pressed with 63.7 MPa at 25° C.

9. The lithium metal oxide powder of claim 1, wherein the powder has an electrical conductivity of less than $10^{-8}$ S/cm, when pressed with 63.7 MPa at 25° C.

10. The lithium metal oxide powder of claim 1, wherein the surface layer comprises more Mn than the core, and wherein the surface layer comprises less Co than the core.

11. The lithium metal oxide powder of claim 1, wherein the islands comprise at least 5 mol % of Mn.

12. The lithium metal oxide powder of claim 1, wherein $n \geq m$, and wherein at the surface of the powder the molar ratio Ni:Mn>1, and said surface Ni:Mn molar ratio being greater than n/m.

13. An electrochemical cell comprising a cathode comprising as active material the lithium metal oxide powder according to claim 1.

14. A method for preparing a lithium metal oxide powder according to claim 1, comprising the steps of:
 providing a mixture of a doped or undoped $LiCoO_2$ powder, a Ni—Mn—Co comprising powder, and a Li-comprising compound, the mixture comprising more than 90 wt % of the doped or undoped $LiCoO_2$ powder, and
 sintering the mixture at a temperature T of at least 910° C., for a time t between 1 and 48 hours,
wherein the quantity of the Li-comprising compound in the mixture is selected to obtain a Li over metal ratio in the lithium metal oxide powder with Li:M≤0.99.

15. The method according to claim 14, wherein the mixture further comprises a compound comprising the dopant A, or wherein the Ni—Mn—Co comprising powder further comprises the dopant A.

16. The method according to claim 14, wherein the quantity of the Li-comprising compound in the mixture is selected to obtain a Li over metal ratio in the lithium metal oxide powder with 0.95≤Li:M≤0.99.

17. The method according to claim 14, wherein the Ni—Mn—Co comprising powder is either a Ni—Mn—Co hydroxide, a Ni—Mn—Co oxyhydroxide or a mixture of both.

18. The method according to claim 14, wherein the doped $LiCoO_2$ powder comprises either one or more of Al, Mg and Ti and is prepared by sintering a mixture of $Li_2CO_3$ and either $Co(OH)_2$ or $Co_3O_4$, the $Co(OH)_2$ or $Co_3O_4$ being doped with either one or more of Al, Mg and Ti.

* * * * *